US007240027B2

(12) United States Patent
McConnell et al.

(10) Patent No.: US 7,240,027 B2
(45) Date of Patent: Jul. 3, 2007

(54) METHOD AND APPARATUS FOR MONITORING THE FLOW OF ITEMS THROUGH A STORE OR WAREHOUSE

(75) Inventors: Theodore Van Fossen McConnell, Cincinnati, OH (US); Henry Sebastian Vaccaro, Los Alamos, NM (US)

(73) Assignees: The Procter & Gamble Company, Cincinnati, OH (US); Standard Analytics, LLC (a Florida Limited Liability Company), Bradenton, FL (US)

( * ) Notice: Subject to any disclaimer, the term of this patent is extended or adjusted under 35 U.S.C. 154(b) by 410 days.

(21) Appl. No.: 09/827,811

(22) Filed: Apr. 6, 2001

(65) Prior Publication Data
US 2001/0049690 A1 Dec. 6, 2001

(51) Int. Cl.
G06Q 10/00 (2006.01)
G06Q 20/00 (2006.01)

(52) U.S. Cl. .......................................... 705/28; 705/16
(58) Field of Classification Search .................. 705/28, 705/29, 7, 8
See application file for complete search history.

(56) References Cited

U.S. PATENT DOCUMENTS 5,533,079 A 7/1996 Colburn et al.

(Continued)

FOREIGN PATENT DOCUMENTS

JP 2155067 A * 6/1999

OTHER PUBLICATIONS

"Where to Look for Incremental Sales: The Retail Problem of Out-of-Stock Merchandise," Study conducted for the Coca-Cola Retailing Council by Andersen Consulting (Draft Report), Mar. 15, 1996.

Primary Examiner—James Kramer
Assistant Examiner—Rajesh Khattar
(74) Attorney, Agent, or Firm—Womble Carlyle Sandridge & Rice, PLLC

(57) ABSTRACT

An item velocity monitoring system is provided which interfaces with a consumer retail store that has several cash registers that are tied into a "point of sale" store controller. The item velocity monitoring system is capable of detecting when sales (or other movement activities) of an item are occurring too quickly, or too slowly. The item velocity monitoring system is first "trained" in a learning mode of operations, during which item patterns and group patterns are evaluated and placed into a pattern database. The system then compares the observed item velocity to its model probability velocity, and if the observed item velocity deviates beyond the statistical model, a "velocity event" is generated, declaring one of the above selling "too quick" or "too slow" conditions. Once a velocity event is detected, an event handling routine displays the event, and can transmit the event information over a network (including the INTERNET) to a remote computer for additional analysis or record keeping. A "Loyalty Out-of-Stock System," (LOSS) is incorporated in the above item velocity monitoring system which automatically detects when items for sale are out-of-stock (OOS), discovers the reasons for these "stock-outs," and determines how customers react to these stock-outs. The LOSS operates on store data and models the expected item movement rate for each item under varying time-of-day, day-of-week, price, promotion, season, holiday, and market conditions; detects items that are moving abnormally slowly, thereby identifying items that may be improperly displayed; provides early warning that an item may go out-of-stock (OOS) by detecting items with abnormally high movement; detects and reports on items that are OOS at retail stores; summarizes OOS events for the store and retail chain management, and for suppliers, thereby identifying items that are over-stocked (too few OOS events), under-stocked (too many events), badly re-stocked (too long events); analyzes the OOS events to find patterns that explain why OOS's are occurring; and determines the impacts of these OOS events on store customers, thereby measuring losses to the retailer and supplier, and establishing the loyalty of consumers to the item, brand, and chain.

137 Claims, 15 Drawing Sheets

U.S. PATENT DOCUMENTS

| | | |
|---|---|---|
| 5,596,493 A * | 1/1997 | Tone et al. .................... 705/10 |
| 5,765,143 A | 6/1998 | Sheldon et al. |
| H001743 H * | 8/1998 | Graves et al. ............... 700/236 |
| 5,924,077 A | 7/1999 | Beach et al. |
| 5,933,813 A * | 8/1999 | Teicher et al. ................ 705/26 |

* cited by examiner

METHOD AND APPARATUS FOR MONITORING THE FLOW OF ITEMS THROUGH A STORE OR WAREHOUSE

TECHNICAL FIELD

The present invention relates generally to computerized item stock monitoring equipment and is particularly directed to a stock-out detector of the type which uses data provided by point-of-sale equipment, such as cash registers. The invention is specifically disclosed as an item velocity monitoring system that analyzes point-of-sale data for retail stores in real time to determine if items are being sold faster than expected or slower than expected, and which can also predict stock-outs in advance and make accurate near-term sales forecasts for individual items at the store level.

BACKGROUND OF THE INVENTION

Retail stores, and their suppliers, normally decide how to stock inventory according to several methods, such as comparing the rate of sales to the current perpetual inventory for an item, and forecasting, using any number of algorithms, when a stock out will occur. Reorder is then timed to the forecast stock-out such that a stock-out will not occur. This first method fails because either the perpetual inventory was incorrect—a frequent condition—the sales pattern assumed by the forecasting was incorrect; also a frequent condition.

Another methodology involves performing periodic examination of shelves to see what is not in stock or near out-of-stock and placing an order based on that condition. This second method fails because the person checking the shelves did not observe a stock-out condition, was not able to identify it (for example, because the "hole" was filled with another item—which often occurs in the retail industry), or did not report it, or it was reported but the proper action was not taken.

Stock-out conditions are generally considered undesirable by the retailer and by the retailer's suppliers. The retailer does not like it because it lowers customer service levels (i.e. their customers can't get what they want, and therefore may not shop there again), and because in many cases people will not buy a substitute product, and the potential sale will be lost. Supply chain partners do not like stock-outs because of lost sales, and because of the disruption in the normal flow of goods, which causes increased order and shipping costs.

Because of the problems with maintaining accurate perpetual inventory, stock-out conditions persist for up to 15% of all items in all stores on average. This constitutes at least a potential 15% efficiency gain opportunity across the retail goods trade. Moreover, improved stocking does not necessarily increase costs, so even a small improvement can yield a relatively large increase in profits.

SUMMARY OF THE INVENTION

Accordingly, it is a primary advantage of the present invention to provide an item velocity monitoring system that typically interfaces with the consumer retail store data warehouse or with individual store point-of-sale (POS) controllers, and which is capable of detecting when movement activities of items are occurring abnormally quickly or abnormally slowly.

It is another advantage of the present invention to provide an item velocity monitoring system that is first "trained" in a learning mode of operations, during which item patterns and group patterns are evaluated and placed into a pattern database, then compares an observed item velocity to its model probability velocity, and if the observed item velocity deviates beyond the statistical model, a "velocity event" is generated.

It is a further advantage of the present invention to provide a "Loyalty Out-of-Stock System" that detects when items for sale are out-of-stock (OOS), discovers the reasons for these "stock-outs," and determines how customers react to these stock-outs, by analyzing detailed data on individual item purchase occasions, such as that produced by conventional point-of-sale (POS) systems, or by analyzing hourly or daily summaries of store item movement where the identity of individual purchase occasions is unavailable.

It is still a further advantage of the present invention to create notification messages describing the detection of fast, slow, and OOS items, and to deliver these messages to appropriate operating personnel and to other computer systems.

It is a yet further advantage of the present invention to provide a "Loyalty Out-of-Stock System" that automatically operates on data for one or more stores and models the expected item movement rate for each item under varying time-of-day, day-of-week, price, promotion, season, holiday, and market conditions; automatically detects items that are moving abnormally slowly, thereby identifying items that may be improperly displayed (e.g., behind another item on the shelf); automatically provides early warning that an item may go OOS (out-of-stock) by detecting items with abnormally high movement; automatically detects and reports on items that are OOS at retail stores; automatically summarizes OOS events for the store and retail chain management, and for suppliers, thereby identifying items that are overstocked (too few OOS events), under-stocked (too many events), badly re-stocked (too long events); automatically analyzes the OOS events to find patterns that explain why OOS's are occurring; and automatically determining the impacts of these OOS events on store customers, thereby measuring losses to the retailer and supplier, and establishing the loyalty of consumers to the item, brand, and chain.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method of using a computer processor to monitor items being received and disbursed within a predetermined environment is disclosed, in which a computer monitoring system is provided having a memory circuit for storage of data, a communications port, and a processing circuit; a plurality of sensing circuits or sensing devices are provided that detect at least one item as it is moved to predetermined locations within the predetermined environment; a probability pattern is determined of a velocity of the item (in which term "velocity" as used herein refers to the frequency with which the item is observed) as it passes one of the plurality of sensing circuits, and the probability pattern is stored in the memory circuit; using the communications port, identification characteristic information is received pertaining to the item as it passes one of the plurality of sensing circuits, and time of day information is received corresponding to when the item was detected by the one of the plurality of sensing circuits; and an observed velocity of the item passing one of said plurality of sensing circuits is compared to the probability pattern, after which it is determined whether or not the observed velocity is anomalous, and if so generating a velocity event announcement that the observed velocity is occurring too slowly, or occurring too quickly.

In accordance with another aspect of the present invention, an item velocity monitoring system is provided, comprising: a plurality of sensing circuits that detect at least one item as it is moved to predetermined locations within a predetermined environment; a computer monitoring system, having a memory circuit for storage of data (the memory circuit containing a quantity of random access memory (RAM) and a bulk memory storage device), a communications port that is effectively connected to at least one of the sensing circuits and to the memory circuit, and a processing circuit that is configured to control the flow of data between the memory circuit and the communications port; the processing circuit also being configured to: determine a probability pattern of a velocity of the item as it passes one of the plurality of sensing circuits, and to store the probability pattern in the memory circuit; to receive identification characteristic information pertaining to the item as it passes one of the plurality of sensing circuits, and to receive time of day information corresponding to when the item was detected by the one of the plurality of sensing circuits; and to compare an observed velocity of the item passing one of the plurality of sensing circuits to the probability pattern, and to determine whether or not the observed velocity is anomalous, and if so to generate a velocity event announcement that the observed velocity is one of: (i) occurring too slowly, or (ii) occurring too quickly.

In accordance with a further aspect of the present invention, a method of using a computer processor to analyze velocity patterns of movement of items being received and disbursed within a predetermined environment is provided, comprising the steps of (a) providing a computer monitoring system having a memory circuit for storage of data, and a processing circuit; (b) receiving data pertaining to at least one transaction involving at least one item of inventory in the predetermined environment; and (c) using a predetermined probability pattern of a velocity of the item, after the transaction determining whether an observed velocity is one of: (i) occurring too slowly, or (ii) occurring too quickly.

In accordance with a yet another aspect of the present invention, a method of using a computer processor to analyze velocity patterns of movement of items being received and disbursed within a predetermined environment is provided, said method comprising the steps of providing a computer monitoring system having a memory circuit for storage of data, and a processing circuit; and automatically training the computer monitoring system using either historical data or data gathered in substantially real time, thereby learning item velocities for a plurality of items.

In accordance with yet a further aspect of the present invention, an item velocity monitoring system is provided having a plurality of sensing circuits that detect at least one item as it is moved to predetermined locations within a predetermined environment; a computer monitoring system that comprises a memory circuit for storage of data, and contains a quantity of random access memory (RAM) and a bulk memory storage device; a communications port that is effectively connected to at least one of said sensing circuits and to said memory circuit; and a processing circuit that is configured to control the flow of data between said memory circuit and said communications port; in which the processing circuit is also configured to receive data pertaining to at least one transaction involving at least one item of inventory in said predetermined environment; and to dynamically determine probability pattern of a velocity of said at least one item, after said at least one transaction to determine whether an observed velocity is one of: (i) occurring too slowly, or (ii) occurring too quickly.

In accordance with still a further aspect of the present invention, an item velocity monitoring system is provided having a plurality of sensing circuits that detect at least one item as it is moved to predetermined locations within a predetermined environment; a computer monitoring system that comprises a memory circuit for storage of data, and contains a quantity of random access memory (RAM) and a bulk memory storage device; a communications port that is effectively connected to at least one of said sensing circuits and to said memory circuit; and a processing circuit that is configured to control the flow of data between said memory circuit and said communications port; in which the processing circuit is also configured to automatically train said computer monitoring system using either historical data or data gathered in substantially real time, thereby learning item velocities for a plurality of items.

In accordance with yet another embodiment of the invention, a method and system for determining the cause of out-of-stock events is provided. The method includes receiving data pertaining to a transaction involving an item of inventory in a predetermined environment, determining that an out-of-stock event exists for the item of inventory, and determining automatically the cause of the out-of-stock event. The method is capable of determining various causes of out-of-stock events including, but not limited to, store problems, retail outlet problems, price reductions, sale promotions and time of day/week/year causes.

Another embodiment of the present invention comprises a method and system for determining customer impact occasioned by an out-of-stock event. The method comprises identifying each of a plurality of customers, correlating current out-of-stock events to each customer's purchasing event, analyzing historical purchasing data for each customer, estimating, for each customer, an expected purchase amount for at least one out-of-stock item based on the historical purchasing data, and comparing, for each customer, the actual purchases during the customer's purchasing event relative to the estimated expected purchase amount for the at least one out-of-stock item. The method and system are capable of determining various impacts, including, but not limited to, substitution of another brand, substitution of the same brand, delaying the purchase and lost sales. In addition, the method and system can determine item loyalty, brand loyalty and store loyalty.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Figure 1:
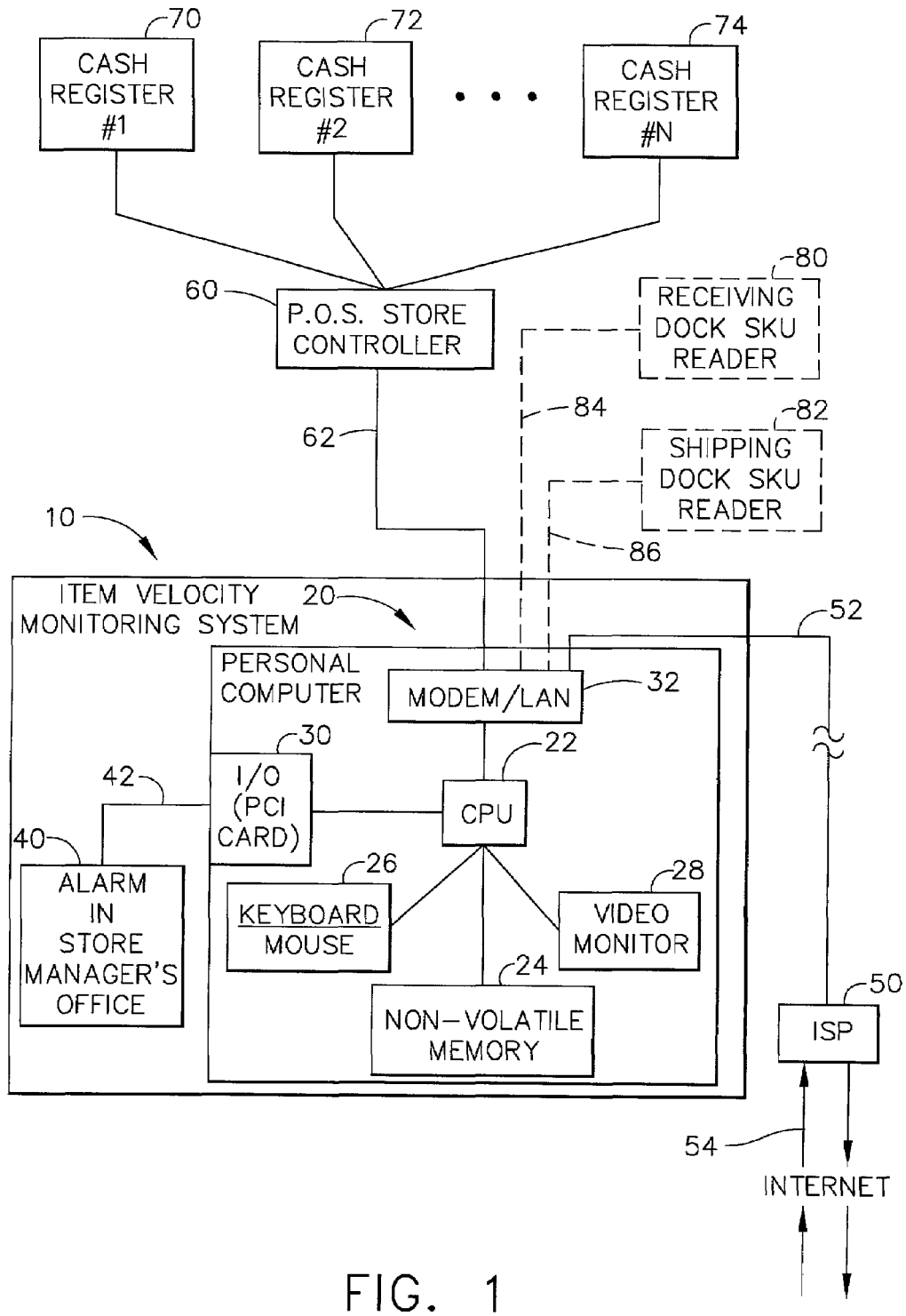
FIG. 1 is a block diagram of the major components of an item velocity monitoring system, as constructed according to the principles of the present invention.

Reference will now be made in detail to the present preferred embodiment of the invention, an example of which is illustrated in the accompanying drawings, wherein like numerals indicate the same elements throughout the views.

In one aspect of the present invention, an item velocity monitoring system is provided which interfaces with a consumer retail store (e.g., a grocery store) that has several cash registers that are tied into a "point of sale" (P.O.S., or POS) store controller, or which interfaces to a data warehouse or other data storage system where current POS transaction data, or hourly or daily POS data summaries, are retained. The item velocity monitoring system includes a personal computer for most retail store applications, although larger computers or smaller modular computers could be used, depending upon the quantity of real time data that is to be processed. A bulk memory device is typically provided to store data in real time, and a modem or LAN is provided to communicate with the POS store controller, or the data warehouse or other POS data storage system, and with a centralized location where further data analysis is accomplished, and perhaps with other remote monitoring devices.

The item velocity monitoring system is capable of detecting when sales (or other movement activities) of an item are occurring too quickly, or too slowly. Both types of information are very useful to the store manager, since an item that is moving too quickly (i.e., with respect to its "expected" velocity of movement) could become out-of-stock before expected, and furthermore an item that is moving too slowly (i.e., again with respect to its "expected" velocity of movement) could be an indication that the item is either out-of-stock in the store, or on the shelf, or some other reason that prevents consumer access to the item.

If an item does not move for a designated amount of time, the item velocity monitoring system will determine the current price of the item from an Item Table stored on the POS controller, or if not available, from the most recent price observed in the transaction data for the item, or in the most recent hourly or daily summary data for the item. One embodiment of the present invention uses this price and a stored item movement probability distribution model for the item and price, together with the store's current sales velocity for either all items combined, or only those item in the same category, depending on which produces more accurate results, to detect items that are moving too slowly or are out-of-stock (OOS), without having to wait for the item to appear in a new transaction.

The item velocity monitoring system is first "trained" in a learning mode of operations, during which item patterns and group patterns are evaluated and placed into a pattern database. The system then compares the observed item velocity to its model probability velocity (i.e., essentially its "expected" velocity), and if the observed item velocity deviates from the statistical model, a "velocity event" is generated, declaring one of the above selling "too quick" or "too slow" conditions. The details of the training and probability analysis of the item velocities are incorporated in a "Loyalty Out-of-Stock System," which is described below.

Once a velocity event is detected, an event handling routine displays the event, and perhaps alerts the store manager (for more critical events), and further can transmit the event information over a network (including the INTERNET) to a remote computer for additional analysis or record keeping.

Another aspect of the present invention is referred herein as a "Loyalty Out-of-Stock System," or "LOSS," which is incorporated in the above item velocity monitoring system. This LOSS aspect of the invention is a computerized item stock-out detection and analysis system. LOSS detects when items for sale are out-of-stock (OOS), discovers the reasons for these "stock-outs," and determines how customers react to these stock-outs. It does this by analyzing detailed data on individual item purchase occasions, such as that produced by conventional point-of-sale (POS) systems, which can be found in many stores.

Some of the many functions that are performed by the LOSS include:

(1) automatically operating on data for one or more stores, handling thousands of individual items in each store, and modeling the expected item movement rate for each item under varying time-of-day, day-of-week, price, promotion, season, holiday, and market conditions;

(2) automatically detecting items that are moving abnormally slowly, thereby identifying items that may be improperly displayed (e.g., behind another item on the shelf);

(3) automatically providing early warning that an item may go OOS (also referred to herein as an "OOS event") by detecting items with abnormally high movement;

(4) automatically detecting and reporting on items that are OOS at retail stores;

(5) automatically summarizing OOS events for the store and retail chain management, and for suppliers, thereby identifying items that are over-stocked (too few OOS events), under-stocked (too many events), badly re-stocked (too long events);

(6) automatically analyzing the OOS events to find patterns that explain why OOS's are occurring; and (7) automatically determining the impacts of these OOS events on store customers, thereby measuring losses to the retailer and supplier, and establishing the loyalty of consumers to the item, brand, and chain.

Conventional inventory control systems do not perform these functions. In fact, for some retail operations, especially grocery stores, existing systems are unsuited to performing these functions. The LOSS of the present invention helps to eliminate both out-of-stocks as well as over-stocks, which most conventional systems do not attempt to do.

The LOSS aspect of the present invention is a system for automatically detecting time periods during which an item for sale is not in stock and automatically analyzing the likely causes and impacts of these out-of-stocks (OOS's). This "OOS detection and analysis system" aspect of the present invention uses detailed transaction level, or hourly or daily summary level, point-of-sale (POS) data from one or more stores for a retailer to train the system so that it can detect OOS events. Henceforth, when the POS data is referenced, it is to be understood that this means either data for individual POS transactions, or for hourly or daily summaries of movement for individual items in each store, and that references to communicating with a POS controller may also mean communicating with a data warehouse or other data storage system that holds POS data. Details on the data content are described hereinbelow.

Referring now to the drawings, FIG. 1 shows the general layout of a grocery store or other type of consumer retail store that has several cash registers that are tied into a "point of sale" (P.O.S., or POS) store controller. In addition to the standard cash registers and POS store controller, an item velocity monitoring system is provided, generally designated by the reference numeral 10. Item velocity monitoring system 10 includes a personal computer generally designated by the reference numeral 20, although reference numeral 20 could instead represent a mainframe computer used for very large data quantity applications, or in certain other applications, the personal computer 20 could be reduced to a module with only one or two main integrated circuit chips. It will be understood that item velocity monitoring system 10 incorporates the Loyalty Out-of-Stock System, (i.e., LOSS).

Personal computer 20 in the illustrated embodiment of FIG. 1 includes a central processing unit at 22, which typically would consist of a microcomputer, microprocessor, or microcontroller. For many applications, a standard microprocessor will suffice for the CPU 22. The CPU 22 is in communication with a standard computer memory, including a non-volatile memory at 24. Furthermore, the CPU would typically be in communication with a keyboard and/or mouse at 26, and a video monitor at 28. Naturally, the video monitor 28 could be a CRT-type technology, or it could be a flat panel display, if desired.

The CPU 22 of personal computer 20 will preferably also be connected to some input-output circuits, such as those that may be found on a PCI card, generally designated by the reference numeral 30. The outputs of such an I/O circuit 30 could be used to drive an alarm in the store manager's office, generally designated by the reference numeral 40, along an electrical circuit 42.

CPU 22 will also preferably be connected to a modem or network card, generally designated by the reference numeral 32 on FIG. 1. This modem or network card at 32 will preferably be connected via a communication link 62 to a point-of-sale (POS) store controller generally designated by the reference numeral 60. In addition, the modem/network port 32 could be connected to an INTERNET service provider (ISP) at 50 via a network line or telephone line at 52. This ISP 50 would then be connected to the INTERNET, which is generally designated by the reference numeral 54 on FIG. 1.

The POS store controller 60 is typically in direct communication with a plurality of cash registers, such as cash registers 70, 72, and 74 on FIG. 1 (also referred to herein as "point-of-sale registers"). Naturally, the larger the store, the more cash registers there typically would be, and each of these cash registers would be connected into the POS store controller 60 in normal installations. Each of the cash registers 70, 72, and 74 will typically be connected to a sensing circuit or sensing device to detect items at the transaction point (i.e., in a retail store setting, at the "point" of sale). In most retail stores today, the cash registers are typically supplied with a bar code reader to determine the item's SKU designation. In future systems, however, other types of sensing circuits could instead be utilized, such as RF detectors to detect an RF tag (to count items), or perhaps RFID readers to not only note the movement of the item, but also to identify the item without literally aiming a light beam and without making any physical contact with the item. Of course, other types of sensors will eventually be developed for retail stores, warehouses, or distribution points, and will be useful for supplying information in conjunction with the present invention.

It will be understood that the terminology "item velocity" or merely "velocity" as used herein refers to a frequency (or rate) at which items (such as goods for sale in retail stores) move throughout a predetermined environment (such as a retail store). In general, the "velocity" is a frequency at which a particular type of item, or particular groups of types of items, is sold or shipped. More specifically, in the present invention item velocity (or "velocity") is a measure of the quantity of certain items as they pass a sensing circuit over a particular time period (or "money" period, as will be explained hereinbelow), and the velocity can be a measure of the frequency of item movement as items are received at a receiving dock, a measure of the frequency of item movement as items are shipped at a shipping dock (or a combination thereof), and/or a measure of the frequency of item movement as items are sold at a point-of-sale device (such as a cash register). The "raw data" that indicates an item's presence at one of the sensing circuits typically includes a time stamp, perhaps an item quantity, and some type of identifying indicia, such as an SKU designation or a bar code label, which is typically detected by a bar code reader (using today's technology).

As used hereinbelow, the terminology "inter-arrival time" refers to the number of time units or monetary units that pass between observations of an item of quantity one (1) or more as it is being detected at one of the sensors/detectors. Therefore, "velocity" is equal to: {inter-arrival time*item quantity÷time/monetary units}. When monetary units are used, they refer to an aggregate or summation across either all types of items (e.g., SKU's), or only those items in a predefined group (e.g., a product brand, or a product category).

In non-retail store settings, such as warehouses or product distribution points, a POS controller would usually not be appropriate, at least not with respect to interfacing directly with consumers. Instead of a POS store controller 60 and a series of cash registers (e.g., cash register 70), these alternative settings could use bar code readers (for example) at a shipping dock and/or a receiving dock to monitor the velocity of item movements in and out of the facility. On FIG. 1, a receiving dock bar code reader, generally designated by the reference numeral 80, is provided and a shipping dock bar code reader, generally designated by the reference numeral 82, is provided. These bar code readers are not connected to a POS store controller (particularly since this site will not likely contain a POS store controller), but instead can be in direct communication with the item velocity monitoring system 10 via a direct connection (at 84 and 86, respectively), or via a LAN or other network. Bar code reader 80 would be used to scan items as they are received at the warehouse/distribution point, and these items could be labeled on their packing cartons, or some type of bill of lading or other invoice documentation. In addition, or alternatively, individual items as they are unpacked from shipping cartons could be scanned in at the receiving dock, in which case the item's SKU would be directly discernible by the bar code reader 80. The shipping dock reader 82 could be used in situations where goods are being returned from the facility to a distributor or a manufacturer, and the SKU (or some other type of indicia on a shipping carton) of the items would be scanned by the bar code reader 82 to maintain an accurate inventory count. As in retail store settings, in lieu of bar code readers a different type of sensing device or sensing circuit could be used, without departing from the principles of the present invention.

In all cases of the bar code readers in FIG. 1 used at shipping docks or receiving docks, or used with cash registers 70, 72, and 74, each of these sensing devices is capable of reading a bar code or other label which will typically contain an item's SKU numeric or alphanumeric designation, or some other identifying indicia. In retail store settings, each of the cash registers 70, 72, and 74 would typically be of the same manufacturer and model number, but that will not necessarily always be true. If the POS store controller 60 is compatible with more than one type of cash register in a single system, then each of the cash registers could conceivably be a different model number, or even supplied by a different manufacturer.

The item velocity monitoring system 10 as illustrated in FIG. 1 can be used to learn the "patterns of sales" of items or groups of items, which is also referred to herein as "patterns of velocity" for the individual or groups of items of merchandise. Once these patterns are learned, the item velocity monitoring system 10 can then detect conditions which are outside a statistical model of those patterns, which are also referred to herein as anomalies or anomalous events. The types of patterns for the statistical model include information concerning sales and/or velocity of each item under varying conditions of price, time of day, season, promotional activities, and competitive activities. Pre-defined sales or velocity reference values are not needed since the present invention is capable of dynamically recognizing the pattern as it develops over a time period of sales and/or velocity activity. The present invention will dynamically establish and adjust thresholds for detecting activity outside of the statistical pattern, substantially in real time. For example, the present invention can detect when items have become out-of-stock, and when they have been restocked.

Figure 2:
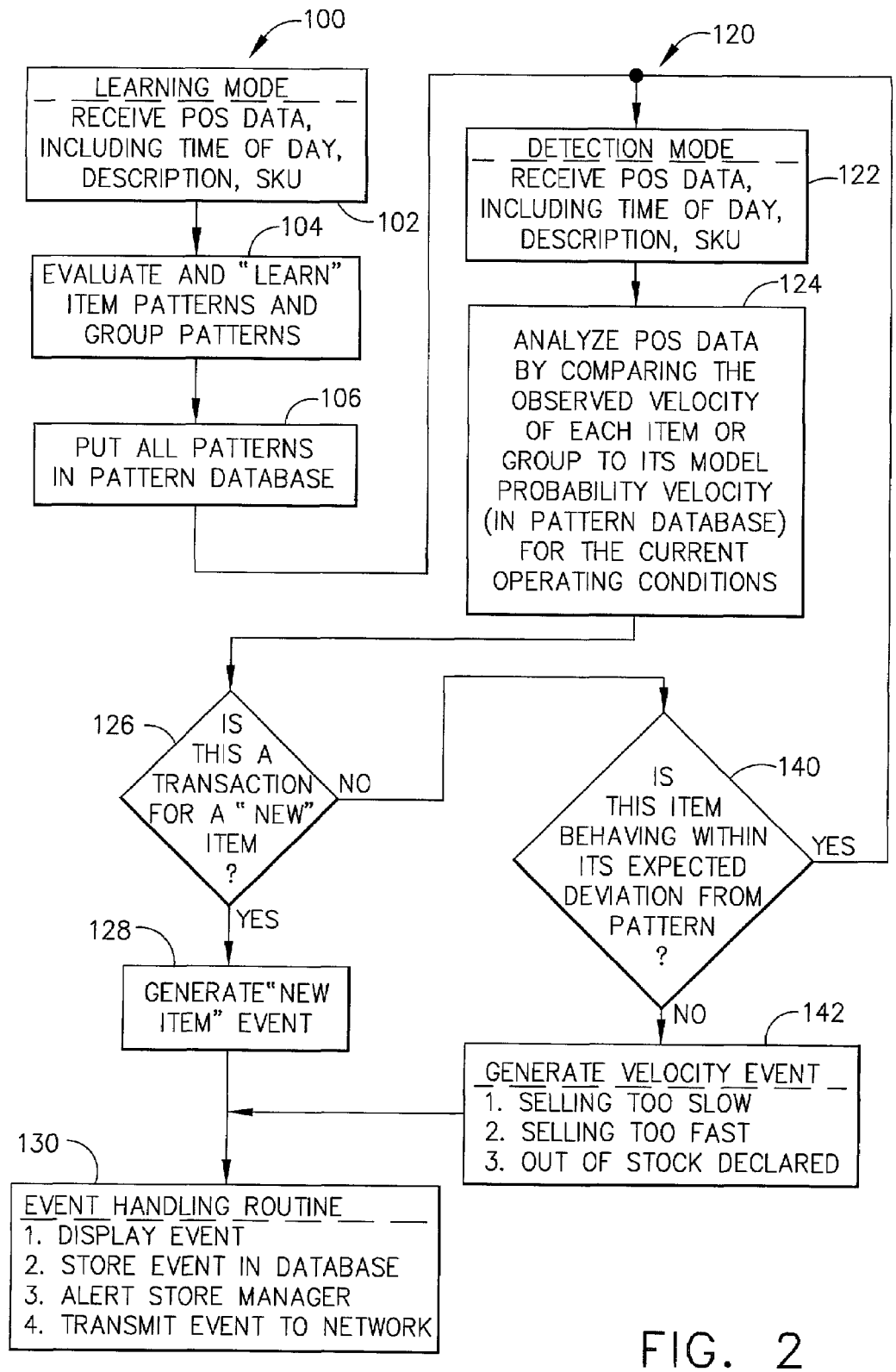
FIG. 2 is a flow chart of some of the major operations performed by the item velocity monitoring system of FIG. 1, showing its Learning Mode and Detection Mode functions.

FIG. 2 is a flow chart that shows some of the important logical operations that are performed by the item velocity monitoring system 10 of the present invention. If the velocity monitoring system 10 is newly installed into a particular store, then it must first undergo a learning process. This begins at a function block 100 that is titled the "Learning Mode." The first step at 102 is to receive point-of-sale data, which will include the time of day, the item description, and its SKU designation. It will be understood that the SKU designation for a particular item is an industry standard piece of information, however, any type of numeric or alphanumeric information could be used to identify individual items or groups of items for use with the present invention, without departing from the principles of the present invention.

The next step at 104 is for the system to evaluate and "learn" item patterns and group patterns. As noted above, these item patterns or group patterns are generally statistical models for sales and velocity of those items or groups under varying conditions of price, time of day, season, promotion, and competitive activities. After items have patterns created for them at step 104, all of the patterns at a step 106 are placed into a pattern database. This would typically involve the CPU 22 of personal computer 20 storing data into the non-volatile memory 24.

It will be understood that non-volatile memory 24 will typically consist of a bulk memory storage device, such as a magnetic hard disk drive using present technology, although for very large systems this could include a read/write optical memory system to store large quantities of data. Of course, in the future even greater data density storage devices will become available, and it may be possible at some day in the not too distant future for a non-volatile memory to be able to store CD-ROM amounts of data on a single non-moving integrated circuit device.

In addition to the above, it will further be understood that the CPU 22 will typically read and write data using standard volatile memory that will consist of Random Access Memory, which could comprise dynamic RAM chips, or as in most modern personal computers, SDRAM (Synchronous Dynamic RAM) integrated circuits. There may be a technology in the future that eliminates the need for fast Random Access Memory if and when a certain type of non-volatile memory device is available that has sufficient speed to keep up with the processing circuit. While this may never occur, the principles of the present invention can be utilized with any type of processing circuit and memory circuit. The need for a non-volatile memory is generally established by the fact that data typically should be preserved when power is shut down for the computer itself, and moreover, most large capacity data storage devices are also non-volatile in nature.

Once all of the patterns have been placed into the pattern database at step 106, the item velocity monitoring system 10 is capable of entering its normal operating mode, also referred to as its "Detection Mode" which is indicated by the reference numeral 120 on FIG. 2. Once in the Detection Mode, the first step at 122 is again to receive point-of-sale data, including time of day, item description, and the item's SKU designation. In step 122, this point-of-sale data is typically generated in real time by the cash registers 70, 72, and 74, for example. Furthermore, any information from the receiving dock bar code reader 80 or shipping dock bar code reader 82 will also be received in real time at step 122. For the purposes of the present invention, the most important data being received is generally the data from the cash registers with regard to analyzing velocity patterns of the items or groups of items that are being sold or otherwise disbursed throughout the store.

The above analysis procedure occurs at a step 124, where the point-of-sale data is analyzed by comparing the observed velocity of each item or group to its "model probability velocity," which is stored in the pattern database. It should be noted that this comparison should take into account the current operating conditions. These current operating conditions may include the item price, time of day, day of week, date of year or season, whether or not any promotional displays or "on sale" activities are occurring, and furthermore whether or not there are any particular competitive activities occurring. All of this different information is included in the model probability velocity for each item or group that is stored in the pattern database of the non-volatile memory 24.

After analyzing the point-of-sale data at step 124, a decision step 126 determines whether or not the current transaction is for a "new" item. The item velocity monitoring system 10 needs to recognize the SKU designation of an item as it passes the point-of-sale sensor or bar code reader, and if it cannot recognize a particular designation as having been one that has been seen before, then it must conclude that the transaction is for an item that is being detected for the first time at this store (at least, within the experience of the item velocity monitoring system 10). If the answer at decision step 126 is YES, then a step 128 generates a "new item" event. The logic flow then is directed to a step 130, which is an event handling routine. Several optional things can occur within the event handling routine 130, including displaying the event on the video monitor 28, storing the event in the database in non-volatile memory 24, alerting the store manager (perhaps by use of the alarm 40 in the store manager's office), or transmitting the event to a network using the modem/network card 32, or transmitting a message describing the event to a pager or a wireless handheld device such as those routinely used by inventory restocking personnel.

It will be understood that the type of network that data is communicated to over the LAN or network card 32 can be one of several different types of networks. This includes Local Area Networks (LAN's), Wide Area Networks (WAN's), intranets, or the INTERNET. Other proprietary networks certainly could also be used without departing from the principles of the present invention. This would include such networks as a WINDOWS 95 network, or an ETHERNET network.

If the result at decision step 126 was NO, then a decision step 140 determines whether or not the item that has just been observed is behaving within its expected deviation tolerance from its statistical pattern. This statistical pattern is also referred to herein as the item's "model probability velocity." Step 140 is in many ways the critical step for making a useful system that can operate as an item velocity monitoring system. The determination as to whether or not an item's current transaction is within its expected deviation from the statistical pattern is a very difficult determination to make without sophisticated functionality, such as provided by a computer program that is constructed according to the principles of the present invention.

It may not be particularly difficult to determine a model probability velocity pattern for certain types of transactions, but it becomes much more complex when conditions that may vary are included in the analysis and statistical model. These varying conditions can include (as noted above) the price, time of day, day of week, season or date of year, promotional activities, and competitive activities. It is important to analyze all of this information so as to not generate alarms when they are not necessary. Further details of how this is accomplished are provided hereinbelow.

If the result is YES at decision step 140, then all is well with respect to the particular item that was just transacted at a cash register, for example, and the logic flow is directed back to the beginning of the detection mode at step 122, where point-of-sale data can be received for the next transaction. On the other hand, if the result at decision step 140 was NO, then the logic flow is directed to a step 142 that generates a velocity event.

At step 142, there are three main types of velocity events that can be annunciated or "announced" by the item velocity monitoring system 10 of the present invention. Three very important conditions can be determined, as follows: (1) an item is selling "too slow;" (2) an item is selling "too fast;" or (3) an out-of-stock condition is declared by the item velocity monitoring system 10. In the case of any of these velocity events, the logic flow is directed to the event handling routine 130, where the particular event can be displayed, stored in the database, transmitted to a network, including the INTERNET, or can be used to create an alert or alarm for the store manager (or sent to a display in the store manager's office).

One major advantage of the present invention is that it can operate in real time or near real time. Since the item velocity monitoring system 10 accumulates data from the point-of-sale store controller 60, that data can be presented almost immediately after a transaction has been recorded by one of the cash registers that are in communication with the point-of-sale store controller 60. In many typical installations, the point-of-sale store controller 60 is designated to transmit its accumulated data on a periodic basis, such as once per minute. Of course, it is also possible for the POS store controller 60 to be designed to transmit its accumulated data in batch format, with periodic batch accumulations occurring on a predetermined or random schedule (e.g., hourly, twice-daily, daily, weekly, monthly, etc.). However, newer point-of-sale store controllers are able to transfer data out virtually as soon as that data is received from any one of the plurality of cash registers that are connected into that POS store controller. In any of the above-described situations, the item velocity monitoring system 10 is capable of receiving the data, whether it is in cumulative packets at particular time intervals, or whether each individual transaction is communicated in an individual data packet from the POS store controller 60 to the item velocity monitoring system 10.

The item velocity monitoring system 10 is capable of calculating the probability of observing zero sales of an item over a particular time interval since the last observed sale of that same item, given the current price of the item from an Item Table, or an estimate made by examining recent prices for the item, and given the total store or category sales over that time interval. If information is available about current and past promotions for this item, the item velocity monitoring system will use this as well in building the model probability velocity. This probability of observing zero sales of an item will be one of the datum points of the model probability velocity statistical pattern stored in the pattern database.

If the probability of observing zero sales over a particular time interval is very low, then in the actual event of a zero sales condition, this particular item is probably not available on the shelf of the store. In other words, an out-of-stock condition has occurred (at the shelf). This, of course, is one of the velocity events that can be generated at step 142. Before declaring the "shelf" out-of-stock condition, however, the present invention takes into account all of the important factors when it computes the probability as described above.

Some of the important factors regarding an out-of-stock condition includes: the normal selling rate for the item in a particular store, as adjusted for past out-of-stock conditions; the effect of its current price and promotions; the effect of store and/or category traffic; the effect of competition in the regional market; and the effect of time-of-day, day-of-week, and week-of-year. As noted above, these factors are all parameters in the statistical model of the probability velocity for the arrival of particular items at the transaction points, such as the point-of-sale cash registers.

The statistical model of the present invention incorporates the above factors to calculate both the median sales rate ($50^{th}$ percentile), and the variability in this sales rate (as a variance), and from this information calculates the probability of zero sales over a particular time interval. These logical and mathematical decisions are described in greater detail in reference to a flow chart on FIG. 9.

Since all factors are derived automatically from point-of-sale data when the item velocity monitoring system 10 is in its Learning Mode 100 (of the flow chart of FIG. 2), there are no pre-defined factors or levels in the statistical model that will be necessary for it to learn. Instead, the statistical model is utilized to build up information from the behavior of a particular store, and this occurs automatically while in the Learning Mode. Once the item velocity monitoring system 10 is put into its Detection Mode of operation, then the analysis steps generally do not wait to flag or annunciate problems, but provide the information in real time or near real time (i.e., substantially real time), essentially as soon as it comes to the conclusion that an item has become out-of-stock. Thus, stock-outs are detected automatically for any item for which historical point-of-sale data is available. Of course, if the item is a "new" item, then the item velocity monitoring system 10 needs to learn more about that item before it can create a statistical model or pattern for that particular item.

In effect, the system can simultaneously operate both its Learning Mode and Detection Mode, using a multitasking processing scheme. Using both modes simultaneously allows the system 10 to refine its statistical model for an item while also being used in operation to monitor the velocity of that same item. Of course, a parallel processing architecture could also be implemented to operate the CPU 22 of the present invention, or it may even be possible to use a logic state machine to handle some of these operations.

The item velocity monitoring system 10 of the present invention will preferably also accumulate data and provide an "expected selling rate" for a period of twenty-four hours and forty-eight hours, to produce accurate sales forecasts for the next two days, for example. In general, the item velocity monitoring system 10 does not necessarily attempt to directly forecast inventory or replenishment levels, but it is able to feed data and statistical pattern information into other systems that perform inventory control and inventory forecast and replenishment operations. Of course, such computer programming operations could all be combined into a single system, although the data provided by the item velocity monitoring system 10 of the present invention is really the critical information needed with respect to being able to analyze the situation in real time. This is something that conventional inventory control systems are just not capable of doing.

The item velocity monitoring system 10 of the present invention tracks recent sales and compares them to what was expected by use of the statistical model probability velocity. Since an item that is selling far too fast or too slowly can be detected, this information is reported so that the retailer can be informed of any potential problems. When an item is selling much more quickly than expected, then of course this item could become out-of-stock on the store shelf much more rapidly than would normally be expected. The store manager, once alerted to the situation, could then take steps to replenish the shelves with further items that are stored back in the storage rooms of the store. Of course, if stock is low or already depleted in the storage rooms, then the store manager has a new problem and needs to order more of these items as soon as possible.

On the other hand, if an item is selling much more slowly than would be expected, this could mean that the item is literally missing from the shelf, even though there are plenty of these items somewhere else in the store. They could be on a different shelf, which could be either a sales shelf or an incorrect shelf altogether, or they could be all in the store room or on a cart someplace where they are not in a condition for a consumer to purchase the item. None of these conditions are desirable, and again the item velocity monitoring system 10 of the present invention can notify the store manager of such an event so that the store manager can take corrective action in real time. It might be simply a matter of moving the items to their proper shelf, or unblocking some type of obstructions that are in front of this particular item's shelf space.

In a preferred mode of operation, the item velocity monitoring system uses a modified Poisson statistical model in which arrivals of items at the transaction points occur at random time intervals. In this statistical model, the probability that such a time interval will be at least "t" units long is equal to P(t>T), or expressed another way, as $e^{-\lambda t}$ ($e^{-lambda*t}$) time units. In the preferred embodiment, time can be expressed in store sales (i.e., in cumulative amounts of dollars being transacted since the previous observation of the item) rather than using actual clock time. For example, one would expect greater sales activity (or velocity of item movement) at noon on a Saturday than at midnight on a Sunday, and the incremental total store income (in dollars) can be used as substitute "time" intervals to more accurately portray and analyze the activity. The value of lambda ($\lambda$) is a function of the factors listed above, as explained in greater detail below. The details of this statistical model are provided hereinbelow.

Other adjustments to these statistical models include compensation for the fact that items being sold in a store often arrive at the point-of-sale cash registers in clumps because a consumer will buy several units of the same item in a single trip to the store. This would, of course, need to be taken into account for an accurate item velocity monitoring system that will not cause unnecessary alarms or "velocity events" as defined in the present invention.

The above adjustment (or "compensation") is accomplished by counting transactions (shopping baskets, in the case of a supermarket application) containing the item, rather than simply the item count, as observations, and measuring the time (in monetary units) between observations. Once this adjustment is made—together with the price, seasonal, promotional, or other adjustments discussed previously—the inter-arrival times, in the absence of OOS events, fit the Poisson model well. The present invention removes the effects of historical OOS events through an iterative process in which the model is trained, then it detects OOS events, then it removes these OOS event from the history, and then it retrains, etc. Throughout this process, the use of the more stable sample median, in addition to the sample mean, greatly reduces the distortion caused by and residual historical OOS effects.

OOS Events

One type of velocity event is an "OOS Event," which is a time interval for a specific item in a specific store during which the item appears to be out of stock. Once the LOSS is trained, it detects OOS events for individual items in each store and creates a database of these OOS events. This database is subsequently analyzed by LOSS to summarize events, determine their causes, and measure their impacts. Some of the important attributes of an OOS event are used as described below to find patterns that help in understanding OOS's. There attributes include the following event descriptors:
  Probability that item is actually OOS;
  Item Number;
  Store Number;
  Time and date of last sale;
  Time and date of next sale after OOS (if any);
  OOS start time and date (accounts for expected time elapsed between sales);
  OOS end time and date (accounts for expected time elapsed between sales);
  Average price prior to OOS;
  Average price after OOS;
  Promotions in effect going into OOS (on ads, temporary price reduction, end aisle display, mark down, shopper card discount, etc.);
  Expected item velocity during OOS;
  Current pricing and promotion adjustment to expected item velocity;
  Actual average velocity prior to OOS;
  Actual average velocity after OOS;
  Lost selling time;
  Total store sales during OOS;
  Total category sales during OOS;
  Lost sales of item;
  Units sold since last stock out;
  Units sold in last 24 hours;
  Units sold in last 7 days; and
  Units sold since last restock date (requires information on normal or actual restock dates for each item or category).

These above attributes may be computed for an individual OOS event or for a collection of OOS events, such as all the OOS events for a specific item. All detected OOS events are stored in a memory-mapped, binary flat-file format for subsequent analysis, referred to herein as the "OOS Events Database." This simple database preferably is maintained in order by store and time. The OOS events database, and all subsequent additions to it, preferably is automatically transmitted to a central location for further analysis. This occurs after initial training, then several times per day (for updates) thereafter.

OOS Event Detection Routine

The LOSS of the present invention detects an "OOS Event" by calculating the probability of observing zero sales of an item since the last observed sale of that item (as discussed hereinabove, as part of the "item velocity monitoring system"). When this probability is very low, then this item is probably not available. In other words, an out-of-stock condition has occurred. The invention takes into account all the important factors when it computes the probability describe above. These factors are all parameters to a statistical model for arrivals of the item at any transaction points (such as POS registers within a supermarket). The model incorporates these factors to calculate the probability distribution for the "time" between sales of the item, referred to herein as the "inter-arrival time."

For retail store applications of the LOSS of the present invention, "time" is preferably measured in units of "sales" rather than actual time intervals (such as minutes or seconds). This will not be true in all applications, and for warehouses or manufacturer's distribution facilities, it may be that actual time is the preferred measurement criteria. In retail store facilities, one penny ($0.01) of store sales is used as a single time unit. For most items, this time unit is based on total store sales. For others, such as fresh milk products, the time unit is total fresh milk category sales. These distinctions can be very important for correctly analyzing situations before "announcing" that an OOS event has occurred.

The decision on whether to use clock time or sales to represent "time" can be made by training the OOS detector once using sales information, and again using clock time information. Then the first or second detector is chosen by comparing the residual errors in the predicted versus actual velocity models. The one with the smaller sum of errors should be used. The residuals can be calculated by subtracting the actual arrivals per unit "time" from the expected number, which is "Base Lambda"×"Adjustment Alpha". Alternatively, simply use the sales based representation of time for any retail operation, and use the clock time version for other types of operations.

From the probability distribution for the inter-arrival time and the probability distribution of the number of units sold at each arrival, the LOSS calculates the median arrival rate ($50^{th}$ percentile), the expected arrival rate (mean), the variability in this arrivals rate (variance), and the probability of zero arrivals in any observed time interval. The model calculates and saves for later use the mean item quantity per observation (Beta) for each item at various prices and promotions for either specific stores, or for groups of similar stores. This information enables the LOSS to estimate lost sales from the modeled inter-arrival times and the actual inter-arrival times. Beta is used as the mean of a Log-Normal probability distribution for the quantity of the item per arrival (that is, per transaction containing the item). This information is used in creating a LOSS statistical model, as discussed hereinabove. All model factors (parameters) are determined by the LOSS during its training phase, and revised as it retrains on new data. These model factors include:

Normal selling rate for the item in a particular store, adjusted for past out-of-stocks;

Effect of the item's current price and promotions; preferably is one in the same "sub-category", or "category" if sub-category is not available, which has an opposite effect on the item when its sales go up or down);

Effect of store and/or category traffic;

Effect of competition in the regional market;

Effect of time-of-day, day-of-week, and season-of-year (or week-of-year); and

Effect of holidays.

In the preferred mode of operating the LOSS of the present invention, all factors are derived automatically by the invention from POS data, so that there are almost no pre-defined factors or levels in the model. Instead, it learns these parameter values from the historical and new data on behavior of each item in a particular store or group of stores by undergoing a training phase (e.g., the Learning Mode 100 on FIG. 1) that gathers the pertinent information automatically from the data. This data can be gathered in real time, if desired, which is a feature that has not been available in conventional store inventory control systems.

After the initial training phase, the LOSS detects OOS events in the historical training data and stores them in its OOS event database (in non-volatile or bulk memory device 24, for example). When running in near real-time mode processing new data, the routine does not wait to flag problems, but gives the information in near real-time (e.g., once per minute). Thus, new stock-outs are detected and stored in the database automatically for any item as soon as the LOSS thinks the item is OOS (out of stock). As noted hereinabove, the determination of an out of stock condition does not necessarily mean that the individual store is actually completely out of stock for a particular item, but will usually indicate that the particular item is not presently on the shelf, or its availability is somehow restricted even though it currently is located correctly.

The sales of each item in each store are modeled as a "renewal-reward" process. The preferred underlying renewal process is a modified Poisson model that describes the time between observed purchases of the item, as discussed below. The Reward process is a Log-Normal distribution that describes the number of items purchased at each purchase instance (also as discussed below).

Modified Poisson Statistic Model

The preferred item inter-arrival time model for the LOSS is a modified Poisson statistical model in which inter-arrival times (of items at the transaction point) are stochastic. (That is, the length of the inter-arrival interval varies, and is governed by a probability distribution.) The probability behaves according to the familiar Poisson distribution, with important adjustments. For the classical Poisson Distribution, the probability that the inter-arrival time (t) is greater than T is given by the following equation:

$$P(t>T)=e^{-\lambda T}$$ (time units).

In the modified statistical model, time is expressed in store sales or category sales (rather than clock time) and lambda ($\lambda$) is a function of the other model factors listed above, such that the effective lambda is equal to "Base Lambda"×"Adjustment Alpha." Lambda's for all items are stored in two tables: a "Base Lambda table," and an "Adjustment Alpha table." The lambda used in the modified Poisson model is the Base Lambda times the Adjustment Alpha. Both the Base Lambda and Adjustment Alpha tables contain entries that are indexed by item number. The lambda table is also indexed by store. The alpha table is further indexed by various values of price, promotion, competitive item promotions, season and other effects that change the "normal" velocity of an item.

Each item in each store has its own entry in the lambda table. However, when there is insufficient data to reliably calculate a value, the training process bases the value of lambda on a combination of the average value across all stores, and the average value across all substitutes. Substitutes are items in the same sub-category or category of similar unit price and size.

Adjustments to Base Lambda for price, promotion, competitive item promotions, season, and other effects are calculated during training, and updated during re-training, then stored in the alpha adjustment table. These adjustments are indexed by item and effect. The different effects are listed above as a portion of the model factors. The alphas are calculated through a routine that first computes observed deviations from the Base Lambda under various conditions. Each of these deviations is an observation. These are split into different samples according to the underlying condition sets (effects). A Kolmogorov-Smirnov (K-S) statistical test is applied to pairs of these samples to decide whether the paired-samples should be combined. The K-S test is applied to the observed deviations in the two samples. Whenever the K-S test yields a low probability that the actual difference between two samples would have occurred if they had the same underlying distribution of deviations, the samples are kept separate. Otherwise, the samples are combined to become a new, larger sample. This process continues until no further aggregation occurs. For each remaining sample, the sample mean and variance of the deviations from the Base Lambdas are retained as the mean and variance of alpha for all the condition sets represented by the sample.

Other adjustments to the preferred statistical model compensate for the fact that items selling in a store often arrive in clumps (because a customer will buy several units of the item in a single trip to the store). The expected quantity sold (referred to herein as the "Beta mean"), and variance in quantity sold (referred to herein as the "Beta variance"), per checkout transaction is stored in a "Beta Table," indexed by item, and effect.

In the preferred mode of the present invention, when a table is indexed by one of more effects, the following conventions are used:

"Price Index"—This is the current price in cents.

"Promotion Index"—This is a Boolean character string of length six (6} in which a "1" in position n means that the n-th promotion type applied to the item sale, and a "0" means that it did not. For example, the default promotion types are as follows: string portion 1—Shopper Card Discount, string portion 2—On Ad, string portion 3—On Display, string portion 4—Temporary Price Reduction, string portion 5—Markdown, string portion 6—Undefined.

"Day-of-Week Index"—This is a day, numbered from 1 to 7 (Sunday).

"Competing Item Promotion Index"—This is a Boolean value for which a value of "0" means that there is no competing item being promoted in the store, and a value of "1" means that there is a competing item being promoted in the store.

"Time-of-Day Index"—This is one of at most five (5) times of the day (i.e., time intervals), as defined when the system is installed. (For example, "23:00 to 5:30", "5:30 to 8:30", etc.)

"Holiday Index"—This is one of at most six (6) holidays, plus "none," as defined when the system is installed. (For example, "Christmas," "New Year," "Easter," "Thanksgiving," "Super Bowl," or "Fourth of July.")

"Season Index"—This is one of at most four (4) seasons defined for the location when the system is installed.

"Market Conditions Index"—This is the ratio of the lowest competing price for the item within the store's market area to the current price of the item, rounded to the nearest 10 percent (10%).

As noted above, the Reward process is a Log-Normal distribution that describes the number of items purchased at each arrival (purchase instance). This Log-Normal distribution is used to model the quantity sold each time the sale of an item occurs. It is a function of item, store, and various other effects. The parameters to the log-normal distribution, mean and variance, are obtained from the Beta Table, discussed above.

The preferred LOSS of the present invention can generate short-term item sales forecasts. The expected selling rate from the model (Base Lambda times alpha times beta) is also summed over the next 24 and 48 hours to produce accurate sales forecasts for the next two days. These forecasts assume that there will be no changes in price, promotion, etc. during the 1-2 day forecast horizon. As noted above, the LOSS of the present invention does not necessarily attempt to directly forecast inventory or replenishment levels, but it is fully capable of providing algorithms in other systems that do perform those tasks. Further, the LOSS of the present invention tracks recent sales and compares them to what was expected by the statistical model. When an item is selling far too fast or too slowly, this too is a problem for the retailer, so the situation is reported by the LOSS. These short-term forecasts preferably are automatically sent to a central location each day so they can be aggregated across stores and used for marketing and supply analyses.

It should be noted that the LOSS of the present invention is quite able to directly forecast in inventory or replenishment levels, if desired, and in fact is more accurate than previous forecasting systems. This is accomplished by removing the effects of stock-outs before generating such forecasting reports.

Training the Loyalty Out-Of-Stock System

Training the LOSS of the present invention: the system is pre-trained on historical data and/or trained once it is in operation on current data as it unfolds. The training is automatic. It is trained automatically on historical data for one or more stores over a sufficiently long period of time to enable the software to learn sales velocities for each item, and how this item's velocity varies with total store velocity, time of day, day of week, season, holidays, and general market conditions in the area where the store is located. This is an iterative process preferably consisting of (six) 6 stages, or "passes," followed by daily re-training at the end of each new day of activity.

Initial Training: the Loyalty Out-of-Stock System is normally trained on 1-2 years of historical data before being used for near real-time detection, although this amount of training can vary for predetermined conditions. As noted above, training occurs in iterative "passes," as described immediately below:

Training Pass 1—In the first pass, the LOSS comes up with a crude estimate of normal velocity (referred to as the "Initial Base Lambda") for each item having at least N observations, and uses this data to estimate normal velocity of similar but slower moving items. In this analysis, N is selectable by the system designer and can have a default value of about twenty (20). In alternative preferred implementations of the present invention, the "top" N items are used, where "top" means those items with the most quantity sold or the most sales value over the most recent K weeks. K would typically be a number like 13, 26, or 52, representing the past quarter, half, or full year.

Training Pass 2—The above initial velocities are used in the stock-out detection module to estimate when the items were out of stock. The resulting OOS time periods are then subtracted from the training data, and the model is retrained to yield a better velocity estimate (referred to as the "Intermediate Base Lambda").

Training Pass 3—The OOS adjustment process is again applied to the training data to produce the first estimate (referred to as the "Initial Alpha") of the effects of promotions, pricing changes and other varying effects. The routine looks at the same item (or class of similar items) across multiple stores and multiple time intervals with the same price, promotion and other conditions.

Training Pass 4—The Intermediate Base Lambdas, together with the Initial Alphas, are used as parameters to the stock-out detection module in training pass 4 to again estimate when items were OOS. These periods are again subtracted from the training data, and the model is trained for the fourth time to yield normal item velocities for each store (referred to as the "Final Base Lambdas").

Training Pass 5—These Final Base Lambdas and the Initial Alphas are then applied to the historical data to once more detect OOS events. As in training passes 2-4, these OOS events are subtracted from the training data, and the effects of price, promotion, etc. are re-computed (referred to as the "Final Adjustment Alphas"). In the same pass through the data, the Beta mean and variances are computed and stores in the Beta Table.

Historical OOS Event Database—At the conclusion of the above five-pass training operation, the Loyalty Out-of-Stock System makes a final run (i.e., and sixth "pass") through the historical data to detect all OOS events and save them in the Historical OOS Events Database. This database preferably is automatically transmitted to a central location for further analysis.

(Daily) Re-Training

As noted above, when the Loyalty Out-of-Stock System is used for a historical view of stock-outs, all of the data is in the initial training set (i.e., there are no new days). However, when the statistical model is used in a "real time mode," the model detects OOS events throughout the day as new data arrives, then preferably retrains itself at the end of the day. This retraining will update the contents of the Lambda, Alpha, and Beta Tables. It does not modify the OOS event database.

The procedural steps to accomplish the daily retraining are as follows:

Append New Data to Historical Data—As new data is processed, it is immediately appended to the historical database. At the end of each new day, this new data is ready for use in re-training. The new canonical transaction data can be automatically transmitted to a central location for storage and further analysis.

Re-Training Pass 1—This pass is identical to the Training Pass 4, discussed above.

Re-Training Pass 2—This pass is identical to the Training Pass 5, discussed above.

It will be understood that re-training could take place at time intervals other than daily without departing from the principles of the present invention.

Out-Of-Stock Patterns

One of the major aspects of the present invention is to find patterns in OOS events. Making useful determinations about this type of information is quite difficult, and in conventional systems of the past, useful information has not been forthcoming. Some of the important types of patterns that are analyzed by the present LOSS are as follows:

Patterns can be for various levels of aggregation of items:
  Individual items;
  Groups of items, such as a sub category like powdered laundry detergents;
  Items of the same brand;
  User-defined groups of items;
  All items combined.

Patterns are also defined for various aggregations of stores, such as for:
  Single stores;
  Groups of stores, such as stores with the same distribution center or the same ownership.

Patterns are computed over various time intervals:
  Year;
  Quarter;
  Over multiple time periods, such as all holidays;

A pattern is a statistical descrippion of OOS events under a set of qualifying attributes and their values. Attributes and their corresponding values are referred to as an "attribute set." The statistical description in the LOSS is either an estimated mean value of a probability distribution or an approximation of the full distribution of values and their probabilities. The qualifying attributes of the events are:
  Start time;
  Duration;
  Brand;
  Time of day;
  Price;
  Promotion;
  Store;
  Day of week;
  Season;
  Holiday;
  Item;
  Flavor (if known);
  Package size (if known);
  Sub-category;
  Category;
  Distribution center (if known);
  Store type (if known);
  Store planogram type (if known);
  Size of shelf facing (if known).

Discovery of Causes for OOS's

Figure 11A:
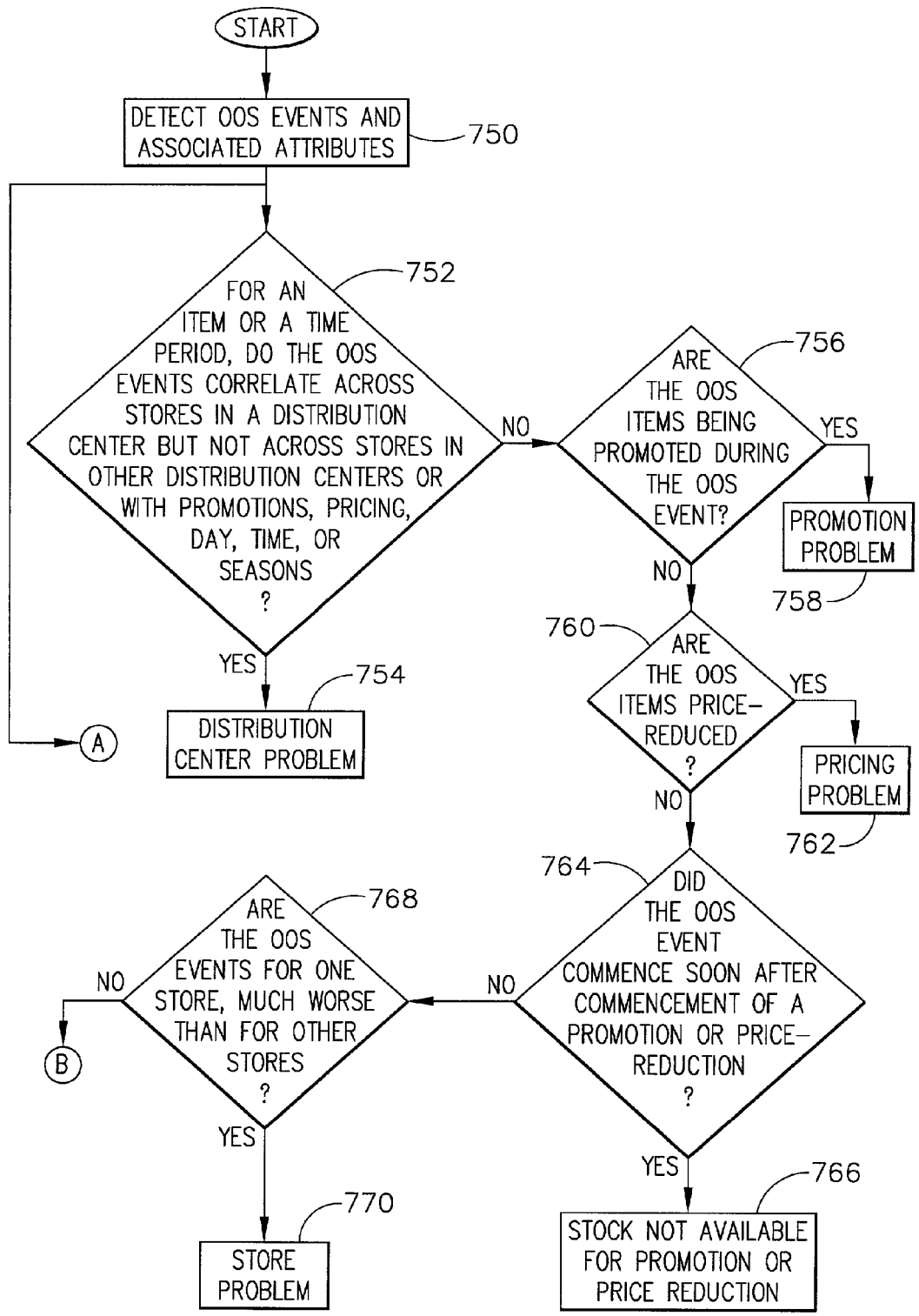
FIG. 11 {comprising FIGS. 11(A) and 11(B)} is a flow chart illustrating the operations performed by a method and apparatus according to one embodiment of the present invention which determines the cause of out-of-stock events.
Figure 11B:
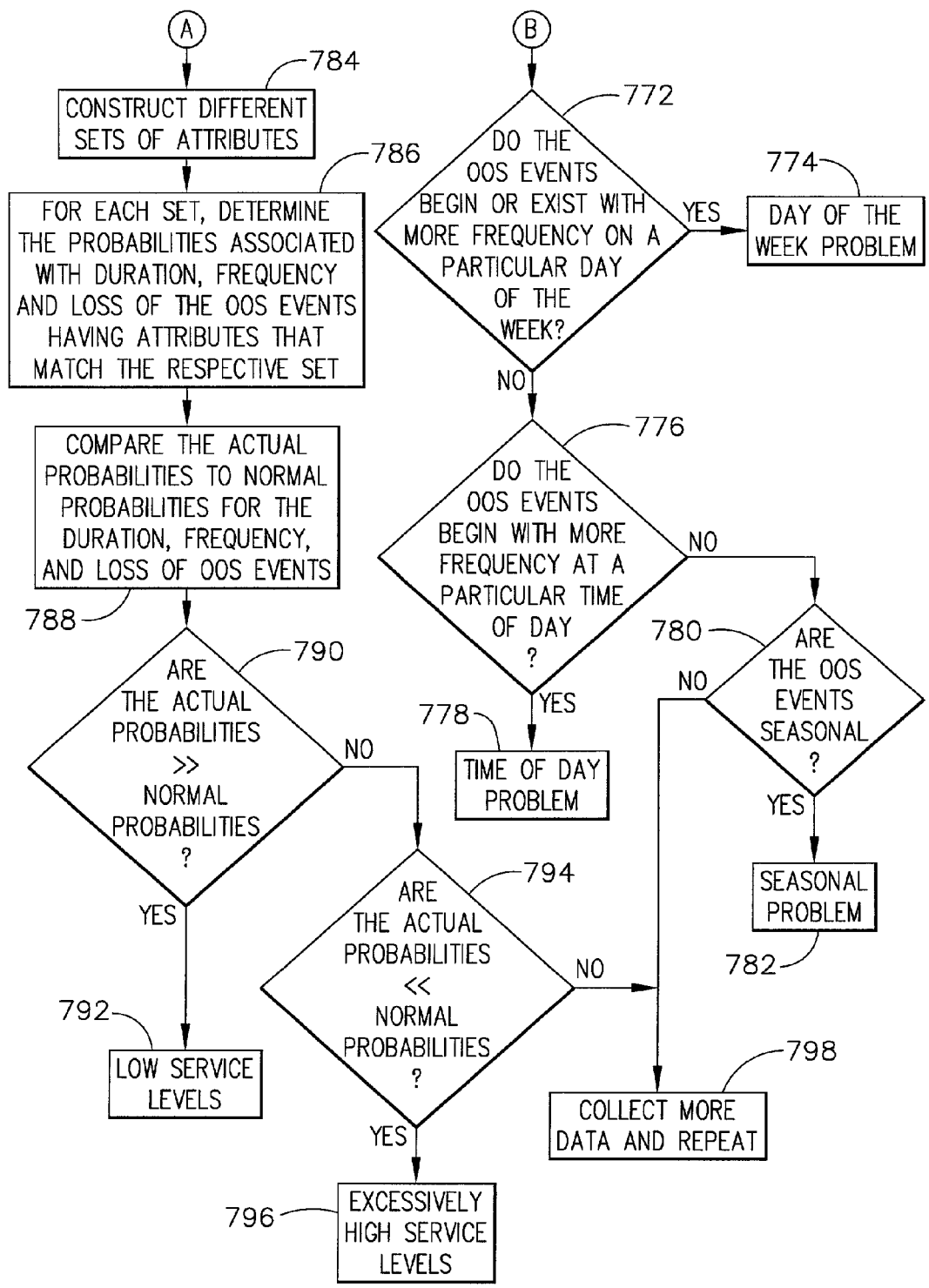

Once a plurality of OOS events have been detected, as shown in a step 750 of FIG. 11, the LOSS of the present invention can automatically determine the cause of at least one OOS event based upon the attributes described above that are associated with the OOS event by using a combination of "standard attribute sets," and "discovered attribute sets" found by an automated induction software algorithm.

Standard Attribute Sets:

With regard to standard attribute sets, certain OOS's are attributable to several common causes, which the system uncovers by applying standard attribute sets to the OOS. For example:

Distribution center problems—This attribute set identifies cases where OOS events for an item or time group are correlated across stores within a distribution center, but not correlated with stores in other distribution centers or with promotions, pricing actions, season, or holidays. For OOS's with this pattern, the probable cause lies with a specific distribution center. See decision step 752 and step 754 on FIG. 11.

Promotion or pricing problems—This attribute set identifies cases where the OOS are most likely due to underestimating the sales lift from a promotion or price decrease. The attribute set selects OOS events where there is no clear distribution center problem, but the OOS items are being promoted or price-reduced when they stock out. This usually indicates that category management staff have under-estimated the customer response to price or promotion actions (or that they intentionally under stock promoted items). It may also indicate clearance items. See decision step 756 and step 758, as well as decision step 760 and step 762, on FIG. 11.

Stock not available for promotion—This attribute set identifies cases where the onset of a stock out occurs very soon after a price reduction or promotion. It indicates that the additional stock that is normally available for promotions has not arrived or was not placed on the shelves or display. See decision step 764 and step 766 on FIG. 11.

Store problems—This attribute set identifies specific stores whose OOS levels are much worse than average stores. This is indicative of store management problems. See decision step 768 and step 770 on FIG. 11.

Day of week problems—This attribute set identifies days of the week when OOS levels are much worse than average. This is done in two ways: based on the day the OOS begins, and based on days during which an OOS is in progress. This is indicative of days in which traffic is high and/or there is insufficient staff available for restocking. See decision step 772 and step 774 on FIG. 11.

Time of day problems—This attribute set identifies "busy" times of the day during which an unusually high number of OOS's begin. This is indicative of times during which store traffic is high, but inadequate restocking activity is occurring (probably because staff are busy with registers). See decision step 776 and step 778 on FIG. 11.

Seasonal problems—This attribute set identifies times of the year when stock-outs are excessive. (This analysis typically requires two or more years of data.) Certain items such as charcoal, cranberry sauce, insecticide, etc. have highly seasonal sales patterns. Excessive stock-outs during periods of high sales would mean that category managers do not have adequate understanding of this seasonality, or are unable to get sufficient stock. See decision step 780 and step 782 on FIG. 11.

Discovered Attribute Sets:

Along with attempting to match attributes associated with the OOS events with one or more of the standard attribute sets, the LOSS of this embodiment attempts to match attributes associated with the OOS events with discovered attribute sets identified by an automated induction algorithm, typically implemented in software. As will be apparent, the discovered attribute sets are preferably different than the standard attribute sets associated with distribution center problems, promotional problems, time of day problems and the like. In particular, the LOSS of one embodiment contains a statistical induction algorithm entitled WISDOM & SENSE (a trademark owned by, and commercially available through, TXN, Inc. of Los Alamos, N. Mex.). The statistical induction algorithm constructs and analyzes a number of different combinations of attributes associated with the OOS events, each combination being termed an attribute set.

From these differently constructed attribute sets, the LOSS preferably automatically discovers attribute sets that are associated with excessive numbers of stock-outs, excessive durations of stock-outs, and excessive losses from stock-outs. WISDOM & SENSE is a specific implementation of a general class of induction data mining algorithms that find conditions (attributes) under which the probability distribution or mean value of a variable differs significantly. Other "induction" algorithms, such as C-4.5, could be used in place of WISDOM & SENSE. In the preferred LOSS, the conditions uncovered by WISDOM & SENSE become a "discovered attributes set" whenever the probability for the number, or length, or cost of OOS events associated with those conditions, has a resulting distribution and median value that is much different than what is normal. ("Normal" is defined by the unconditional distribution—that is, when there are no special conditions). See steps 784, 786, and 788 on FIG. 11.

In the WISDOM & SENSE algorithm, "much different" is determined by the K-S test results that the WISDOM & SENSE algorithm performs each time it tests a candidate set of attributes. By default, a K-S probability of 0.01 or less, together with a difference in sample means of at least 5 percent (5%), implies that the distributions are "much different".

Low service levels—When the distribution associated with the discovered attribute sets results in a larger mean value, the discovered attributes have identified conditions under which low service levels occur. These are cases where there is not enough stock. See decision step 790 and step 792 on FIG. 11.

Excessively high service levels—When the distribution associated with the discovered attribute sets has a very low mean value, the discovered attributes have identified conditions under which service levels are too high (the item is nearly always available). This means either the item does not sell or there is too much stock in the store. Either the item should be eliminated, the shelf space should be reduced, or the frequency of restocking should be reduced. See decision step 794 and step 796 on FIG. 11. In instances in which the LOSS does not match the attributes associated with an OOS event with a standard attribute set or a discovered attribute set, the LOSS preferably collects more data and repeats the analysis process. See step 798 on FIG. 11.

OOS Impacts Analysis

Figure 12:
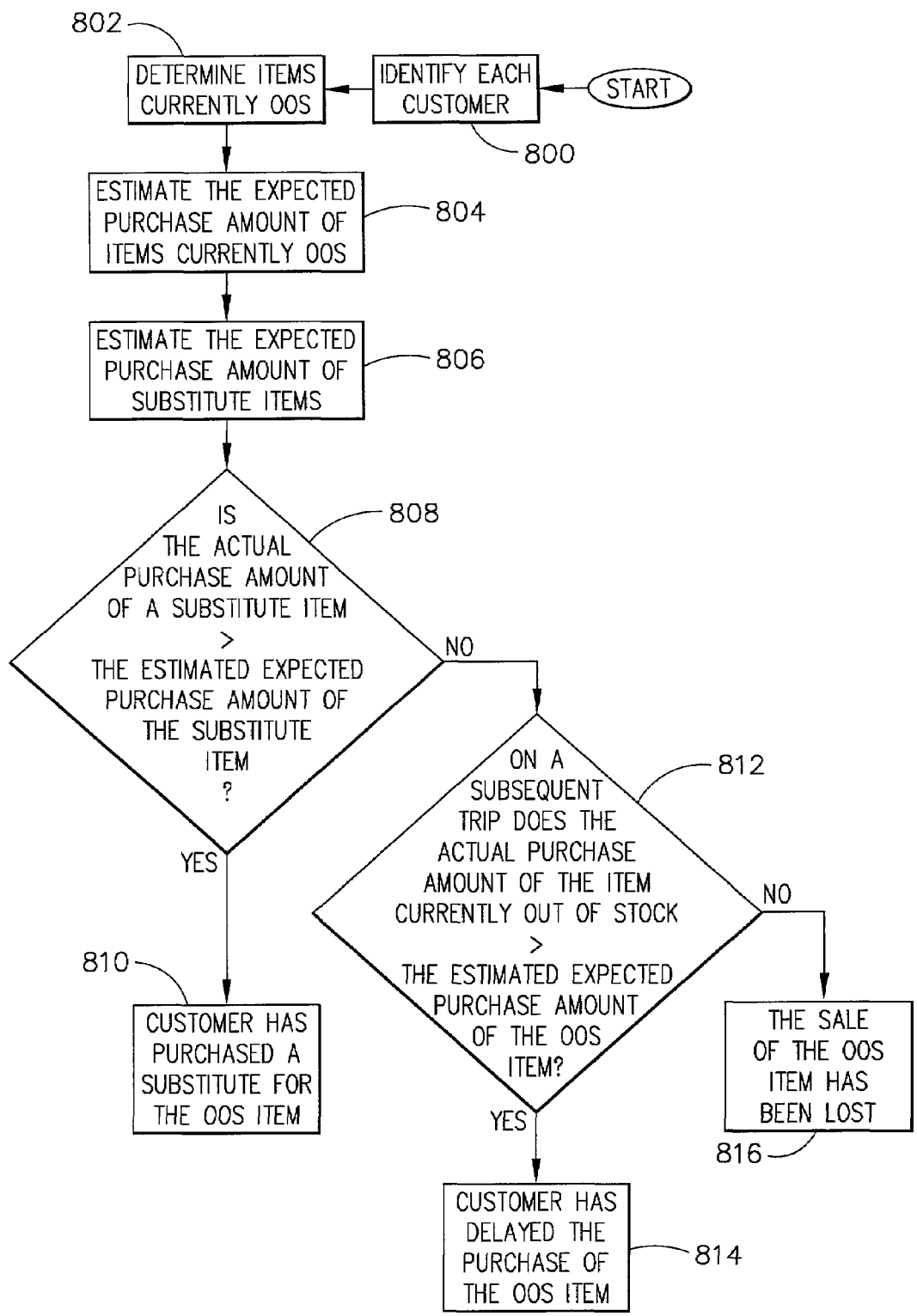
FIG. 12 is a flow chart illustrating the operations performed by a method and apparatus according to one embodiment of the present invention which determines customer impact occasioned by an out-of-stock event.

As depicted in FIG. 12, the LOSS of the present invention will determine what customers do when confronted with an OOS event, if the POS data contains a customer number. This analysis works by tracking what is out-of-stock when each identified customer shops. When the customer checks out, all items that the customer has previously purchased are examined. The system uses historical data to estimate the expected amount of each item to be purchased given the size of the transaction (check out). See steps 800, 802, 804, and 806 on FIG. 12. Some of the possible reactions by a customer, or other related factors are as follows:

Substitution—For each of these items that is currently out-of-stock, the LOSS calculates whether the amount of substitute items is above the expected purchases of these substitutes by the customer. Any increase in purchases of substitutes over the expected value is counted as a switch to the substitute. If the amount of switching is less than or equal to the expected amount to be purchased of the OOS item, then the system assumes that the customer satisfied his demand for the OOS item completely by switching. Substitutes are found in two alternate ways: the first way treats all items in the same category as substitutes. The second way is more restrictive. All items in the same sub-category are substitutes. Switching to substitutes of the same brand is tabulated separately from switching to other brands. See decision step 808 and step 810 on FIG. 12.

Delayed Purchase—If switching does not account for the total expected purchase of the OOS item, the LOSS determines whether an item purchase was satisfied on the customer's next trip. This contribution is measured by subtracting the expected purchase for the next trip from the actual purchase for the item. If this is greater than zero, this excess purchase is considered to be a delayed purchase from the previous trip in which the customer experienced an OOS event. See decision step 812 and step 814 on FIG. 12.

Lost Sales—Finally, if the amount of switching plus delayed purchase is still less than the expected purchase amount when the customer experiences the OOS, the remainder is counted as a lost sale for the retailer. See step 816 on FIG. 12.

Item Loyalty—When summed over all consumers of the item who experienced an OOS of the item, the LOSS provides an excellent estimate of what the average customer does when an item is out of stock; for example: amount switched to same brand, amount switched to other brand, amount due to a delayed purchase, and amount from a lost sale. The system combines this information into a single measure of customer loyalty to the item. This measure is computed as ("fraction of sales lost"+j×"fraction of sales switched to same brand"+k×"fraction of delayed purchase"). The parameters j and k have default values of three (3), and their values can be changed when the system is installed. Larger values of this measure are associated with higher loyalty to the item.

Brand Loyalty—The average loyalty of all items of a particular brand measures brand loyalty.

Retail Chain Loyalty—Store loyalty is measured by taking the average across all items of (1−"n fraction of sales lost").

Alternative OOS Impacts Analysis

Figure 13:
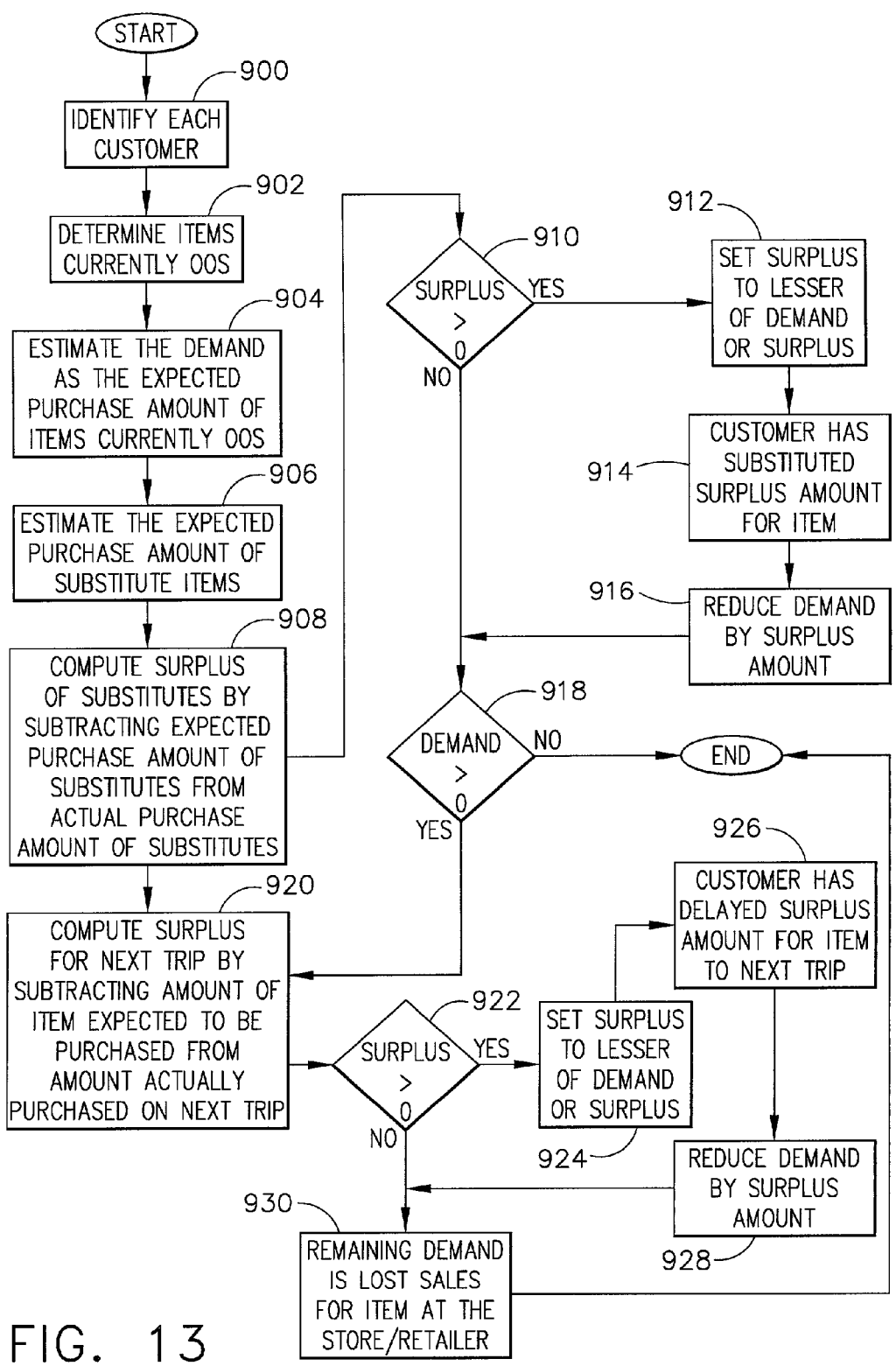
FIG. 13 is a flow chart illustrating the operations performed by an alternative method and apparatus according to another embodiment of the present invention which determines customer impact occasioned by an out-of-stock event.

An alternative, more detailed, methodology can be used for analysis of OOS impacts on customers and for measuring loyalty to items, brands, and store chains. This alternative methodology makes use of the detected OOS events as a "test" of consumer loyalty. Such testing could be conducted by intentionally denying access to various items and then measuring consumer response, but it is far preferable to make use of the frequent, unintentional stock out events to accomplish this measurement. As depicted in FIG. 13 (for this alternative methodology), the LOSS of the present invention will determine what customers do when confronted with an OOS event, if the POS data contains a customer number.

This analysis works by tracking what is out-of-stock when each identified customer shops. When the customer checks out, all items that the customer has previously purchased are examined. The system uses historical data to estimate the expected amount of each item to be purchased given the size of the transaction (check out). See steps 900, 902, and 906 on FIG. 13. It also estimates the "demand" as a variable quantity defined as the expected purchase amount of items that currently are out-of-stock, in a step 904. Some of the possible reactions by a customer, or other related factors are as follows:

Substitution—For each of these items that is currently out-of-stock, the LOSS calculates whether the amount of substitute items is above the expected purchases of these substitutes by the customer. Referring now to the flow chart of FIG. 13, a step 908 computes a "surplus" of substitute items (a variable) by subtracting the expected purchase amount of substitutes from the actual purchase amount of substitutes. If the surplus variable (or surplus "amount") is greater than zero (0), as determined by a decision step 910, then a step 912 sets the surplus variable to the lesser value of the "demand" or the previous "surplus" value. Otherwise, decision step 910 directs the logic flow to another decision step 918.

After step 912 sets the surplus variable, a step 914 concludes that the customer has substituted the surplus amount for the item that was OOS. A step 916 now reduces the demand variable by the surplus amount.

The decision step 918 determines whether the demand variable is greater than zero (0), and if not, finishes this routine. If the demand variable is greater than zero, then a step 920 computes the surplus variable's value for the "next trip" by subtracting the amount of the item expected to be purchased from the amount actually purchased on the next trip. A decision step 922 then determines whether or not the surplus variable (or surplus "amount") is greater than zero (0).

Delayed Purchase—If switching does not account for the total expected purchase of the OOS item, the LOSS determines whether an item purchase was satisfied on the customer's next trip. If the result at decision step 920 was YES, then a step 924 sets the surplus variable to the lesser value of the "demand" or the current surplus value. A step 926 then concludes that the customer has delayed buying the surplus amount for this item until the next trip to the store. A step 928 now reduces the demand variable by the surplus amount.

Lost Sales—Finally, if the amount of switching plus delayed purchase is still less than the expected purchase amount when the customer experiences the OOS, the remainder is counted as a lost sale for the retailer. If the result at decision step was NO, then a step 930 concludes that the remaining demand represent lost sales for the item at the store/retailer. This routine ends after that step.

It should be noted that the logic flow from step 928 can either go to the "END" of this routine, or more preferably, it is directed to the step 930 where the remaining demand is designated as "lost sales" for the store. In this second instance, the lost sales may either be permanent or temporary. If the logic flow reaches step 930 from step 926, then the lost sales amount is only temporary.

Item Loyalty—When summed over all consumers of the item who experienced an OOS of the item, the LOSS provides an excellent estimate of what the average customer does when an item is out of stock; for example: amount switched to same brand, amount switched to other brand, amount due to a delayed purchase, and amount from a lost sale. The system combines this information into a single measure of customer loyalty to the item. This measure is computed as ("fraction of sales lost"+j×"fraction of sales switched to same brand"+k×"fraction of delayed purchase"). The parameters j and k have default values of ten (10), and their values can be changed when the system is installed. Larger values of this measure are associated with higher loyalty to the item.

Brand Loyalty—The average loyalty of all items of a particular brand measures brand loyalty.

Retail Chain Loyalty—Store loyalty is measured by taking the average across all items of (1−"fraction of sales lost").

It will be understood that there are other methods of calculating loyalty besides those presented above. The above specific implementation should not be construed as being the only method of calculating this loyalty from detected stock outs, and the way in which consumers react by substituting another item of the same brand, switching to another brand, purchasing on a later occasion, or not purchasing at all. It is contemplated that the present invention can combine these factors in other ways to produce a loyalty measurement.

Input Data

With regard to data that is input to the LOSS, the OOS detection analysis system works on commonly available POS data streams or other similar data sources. It also makes use of information about each item, herein commonly called the "Item table." (In some circumstances, it could be referred to as a "UPC Table, or SKU Table.") Finally, it optionally makes use of store information.

The POS data—This data stream or a similar data stream includes the following information:
Time and date of transaction;
Store number;
Customer number (optional);
Item number;
Quantity purchased;
Amount paid (extended or unit);
Amount of discount;
Promotion, display, ad, price reduction, coupon (these are not necessarily in the same data stream as the POS data).

Alternatively, the POS data can consist of hourly or daily summary data:
Hour and day of summary;
Store number;
Item number;
Quantity sold;
Average price;
Average discount;
Promotion, display, add, price reduction, coupon;
Average units sold per transaction (this might come from a sample of transaction data that includes the items to be monitored, or from a table derived from data for other retailers. If unavailable, it is a manually input parameter R, with a suggested value of 1.5).

The Item table—This table contains the following information for each item:
Item number (may be same as UPC);
UPC number;
Description;
Shelf space allocation (optional);
Package size (optional);
Flavor (optional);
Brand;
Manufacturer;
Major category (optional);
Category;
Sub-category;
Regular Price;

Current Price;
Current Promo Type; (optional)

The Store table—All information in this table is optional. The store table contains the following information for each store:
Store number;
Store description;
Store location;
Store distribution center;
Store marketing area;
Store type;
Store planogram type.

Figure 3:
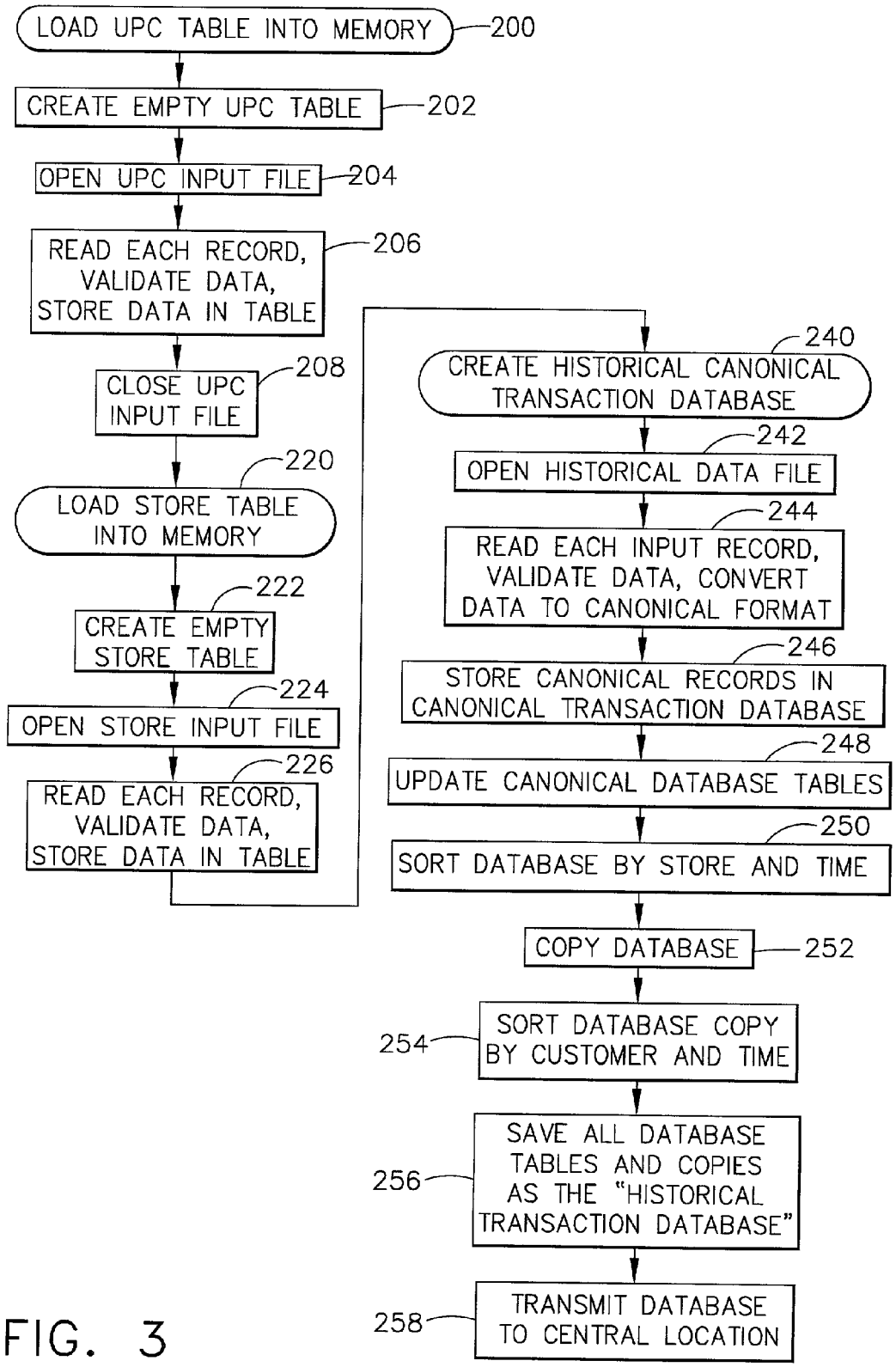
FIG. 3 is a flow chart of some of the detailed logical and mathematical operations performed by the item velocity monitoring system of FIG. 1, showing steps to create certain tables to create a Historical Transaction Database.

In conjunction with the descriptive information provided hereinabove, several flow charts are also provided with more detailed explanations about many of the important logical or mathematical operations that are performed by the present invention. A step 200 on FIG. 3 signifies the beginning point of a "Load UPC Table into Memory" routine. At a step 202, the first operation is to create an empty UPC hash table. (Note: a "hash table" as used herein refers to a table in memory that can be quickly indexed by a specific key, which can be an arbitrary string of bits.) A step 204 now opens an Item input file (which preferably consists of ASCII text). Now a step 206 reads each input record, validates the data (while discarding bad data), and stores the data in hash table, keyed by Item Number. A step 208 then closes the Item input file.

A step 220 signifies the beginning point of a routine that loads the "Store Table" into memory. A step 222 creates an empty store hash table, after which a step 224 opens a store input file (preferably ASCII text). For each input record, a step 226 reads the record, validates the data (while discarding bad data), and stores the data in the hash table, keyed by Store Number.

A step 240 signifies the beginning point of a routine that creates an Historical Canonical Transaction Database. This database is "canonical" because it will re-format data streams into a standard format, if necessary, that is most usable by this database. In other words, the LOSS can receive data from stores (or warehouses or distributors, or archival data for that matter) that is not always in the same format, so long as the LOSS's computer is made aware of the type of data format that is being received. Therefore, more than one type or manufacturer of POS controller can be interfaced to the LOSS of the present invention.

This first function of this routine opens a historical data file at a step 242, in which this historical data file will normally consist of various binary, ebcdic, packed-decimal, and ASCII formats. For each input record, a step 244 reads the record, possibly by combining portions of the record from multiple input sources, then validates the data (while discarding bad data), and converts the data to a canonical format. A step 246 now stores the canonical record in a canonical transaction database.

Now a step 248 updates the canonical database hash tables. A step 250 sorts the database by store and time. A step 252 copies the database to create a second copy that can be sorted by a different set of criteria, and a step 254 sorts this database copy by customer and time. Finally, a step 256 saves all database hash tables and database copies as the "Historical Transaction Database." An optional step 258 may be used to transmit the canonical database to a central location for storage and further analysis.

Training the Out-Of-Stock (OOS) Detector

Figure 4:
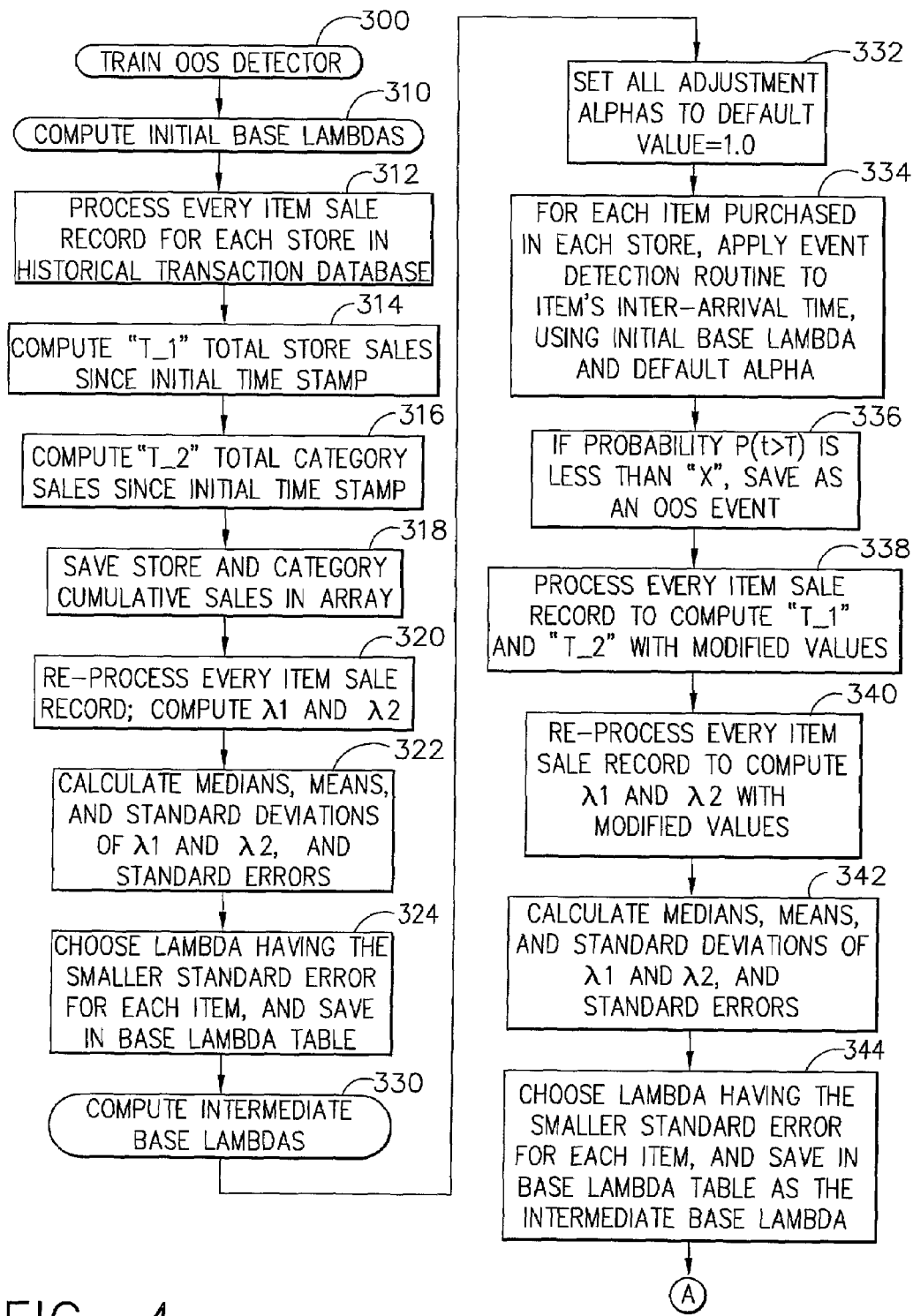
FIG. 4 is a flow chart of some of the detailed logical and mathematical operations performed by the item velocity monitoring system of FIG. 1, showing initial steps to train the OOS Detector.

Now referring to a logic block 300 on FIG. 4, as discussed hereinabove the training of the OOS detector occurs in multiple passes. A step 310 signifies the beginning point of the first pass of training, which computes the Initial Base Lambdas. Much of the logical and mathematical operations are iterative, and typically the same functions will be performed on each item record or combination item/store record, one at a time. At a step 312, for each store in the historical transaction database, every item sale record is processed. Then data is accumulated, by: computing the total store sales "T__1" since initial time stamp at a step 314, computing the total category sales "T__2," for each category, since initial time stamp at a step 316, and saving the store and category cumulative sales in memory as an array indexed by timestamp in minutes since initial time at a step 318.

A step 320 now re-processes every item sale record, and computes individual item lambdas. "Lambda__1" ($\lambda 1$) is calculated as follows: for the current item, at each observed price, and for different combinations of promotion and season, etc., calculate Ai for the observation of a specific item, store, price, promotion, etc. as the inter-arrival time (time between observing the item in a transaction) divided by store sales (T__1) in the corresponding time interval. Find and save the sum of Ai, median of Ai, and sum of Ai squared. If there are too few observations for good estimates under specific conditions, then before computing the sum, median, and sum of Ai squared, combine observations for similar prices and other conditions to increase the sample size. This may be accomplished by use of a 2-sample Kolmogorov-Smirnov (K-S) test to see if the observed Ai's for two similar sets of conditions are probably different based on the K-S test statistic.

Store sales T__1 in the interval are obtained from the array created in step 318. "Lambda__2" ($\lambda 2$) is calculated in the same way, except divide by elapsed category sales T__2. The sums, median, and sums of squares of lambda__1 and lambda__2 are maintained.

For each item, a step 322 uses the sums, the medians, and sums of squares of lambda__1 and lambda__2 to calculate their means and standard deviations, and from these, the standard errors. The means E are first calculated from the medians M, using the formula E=M/(natural log 2). Now a step 324 chooses the lambda with the smaller standard error for each item in the store, and saves this information in the Base Lambda Table as the Initial Lambda for the store-item. All of the steps 312 through 324 are executed for each item of a single store, and then this processing continues with the next store until all stores are processed that reside in the historical transaction database.

A step 330 signifies the beginning point of the second pass of training, which computes the Intermediate Base Lambdas. Again, much of the logical and mathematical operations are iterative, and typically the same functions will be performed on each item record or combination item/store record, one at a time.

At a step 332, all adjustment Alphas are set to a default value of 1.0. It will be understood that different default or starting values could be used for the adjustment Alphas without departing from the principles of the present invention. Then for each store, and for each item purchased, a step 334 applies an "OOS event detection routine" (which is discussed in greater detail in reference to a step 500 on FIG. 9) to the item's inter-arrival time, using the Initial Base Lambda times the default Alpha. A computed probability variable will now be used, referred to herein as "P(t>T)," which represents the computed probability of the Poisson inter-arrival time t being longer than the observed inter-arrival time T.

Figure 10:
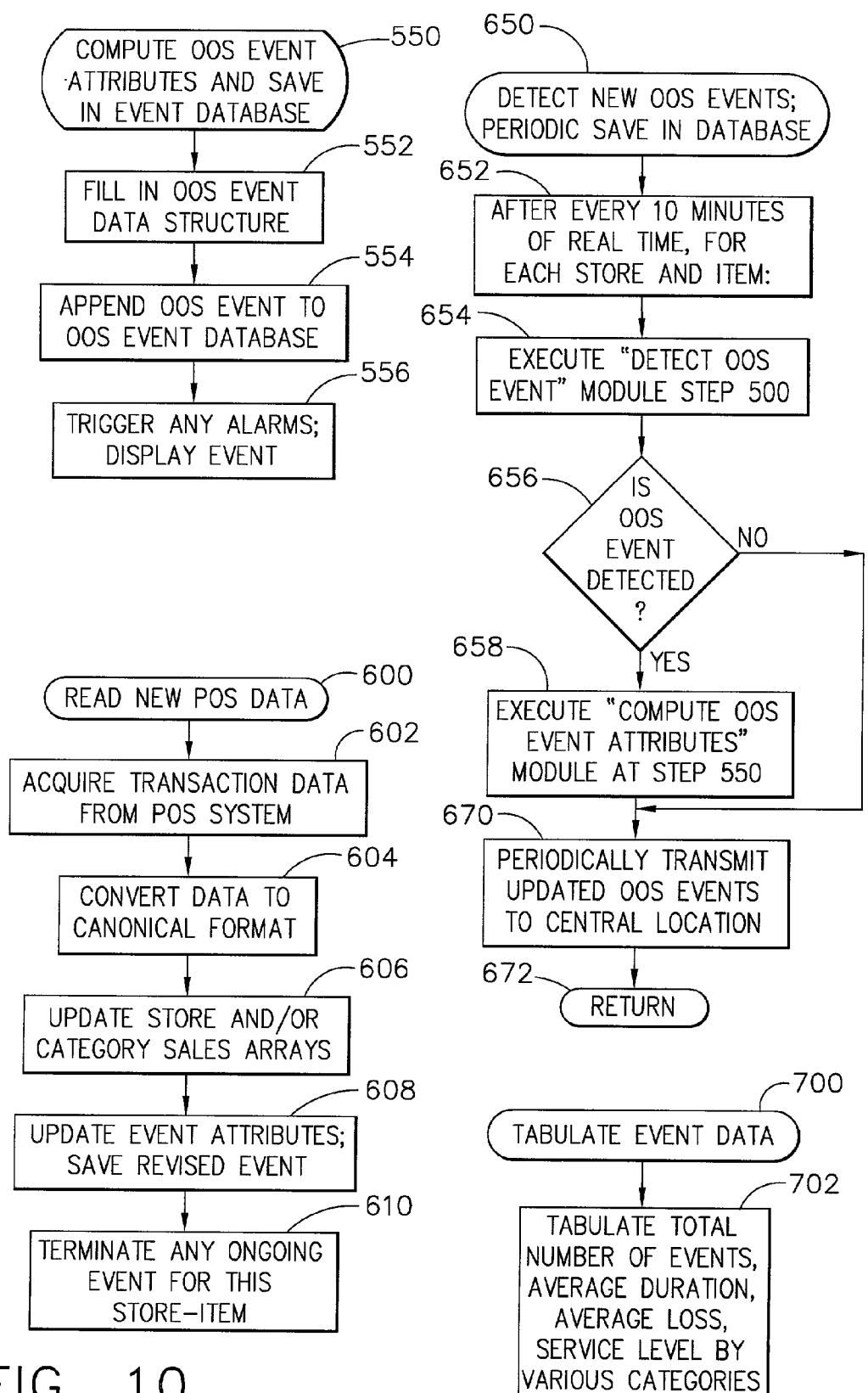
FIG. 10 is a flow chart of some of the detailed logical and mathematical operations performed by the item velocity monitoring system of FIG. 1, showing steps to compute OOS Event attributes; to read new POS data; to detect new OOS Events; and to tabulate event data.

A step 336 now determines the following: if P(t>T) is less than "X", then save this information as an OOS event for the store-item using a logic routine described in greater detail in reference to a step 550 on FIG. 10. The default value of X preferably is set to 0.005, however, this value can be changed when the system is installed or maintained. The default value of 0.005 results in a low false alarm rate, but more OOS events are "missed" (i.e., they are not determined or "announced" as being an OOS event). It will be understood that a different default value for X could be used without departing from the principles of the present invention. The functions performed by steps 334 and 336 are repeated until there is no more historical data for the store. The historical transaction database pointer is now reset to the first item record for this store.

A step 338 now processes every item sale record according to steps 312 through 318, with the following modifications: if any OOS event time intervals saved in step 336 for the item overlaps the current inter-arrival time interval, then (1) subtract the store sales during the OOS event from stores sales in step 320, and (2) subtract the category sales during the OOS event from category sales in step 320, to compute T_1 and T_2 with modified values. In addition, a step 340 re-processes every item sale record according to steps 312 through 318, with the same modifications as above, to compute lambda_1 and lambda_2 with modified values.

For each item, a step 342 uses the sums, medians, and sums of squares of lambda_1 and lambda_2 to calculate their means and standard deviations, and from these, the standard errors. A step 344 now chooses the lambda with the smaller standard error for each item in the store. This value is saved in the Base Lambda Table as the Intermediate Base Lambda for the store-item. Finally, this second training pass is completed by emptying the OOS event table, and repeating steps 334 through 344 until there are no more stores.

Figure 5:
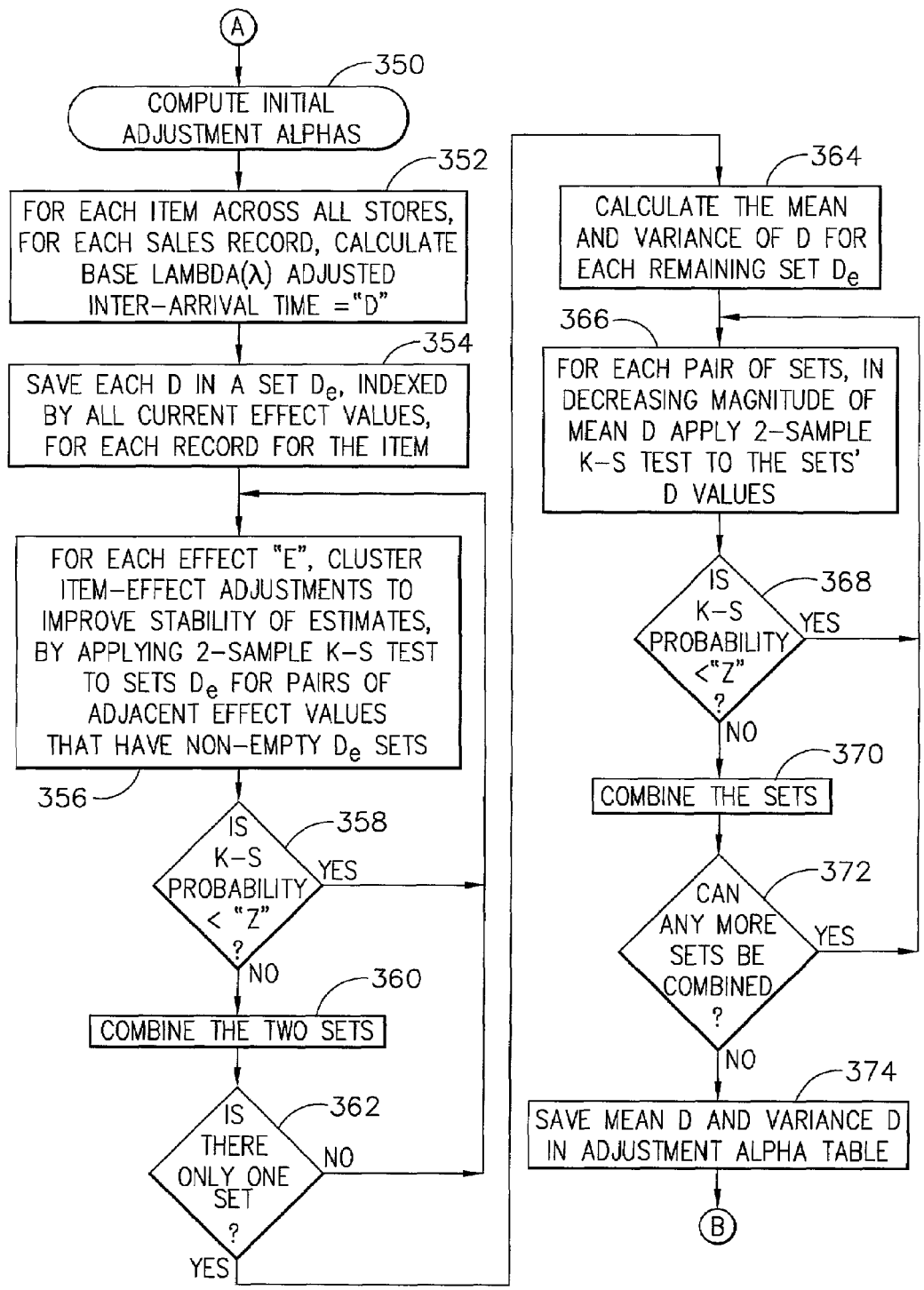
FIG. 5 is a flow chart of some of the detailed logical and mathematical operations performed by the item velocity monitoring system of FIG. 1, showing intermediate steps to train the OOS Detector.

A step 350 (now referring to FIG. 5) signifies the beginning point of the third pass of training, which computes the Initial Adjustment Alphas. Once again, much of the logical and mathematical operations are iterative, and typically the same functions will be performed on each item record or combination item/store record, one at a time, although in some cases, calculations will involve all stores for a particular item.

Starting with a step 352, for each item across all stores, and for each sale record for the item, deviations "D" of the actual inter-arrival times from the Base Lambda are calculated for every item, every time a sale is observed. These observations occur under various conditions of price, promotion, season, time-of-day, day-of-week, holiday, market conditions, etc. The term "effect" refers to these different conditions. At a step 354, these deviations for each effect are saved in a set $D_e$ indexed by the effect values (price, promotion, season, time-of-day, day-of-week, holiday, market conditions). This indexing is accomplished by using the effect values to create a key into a hash table that stores the D values for each set $D_e$. All effect values (e.g., the 6-digit Boolean promotion string) are treated as if they were ordered values, as opposed to categorical values. Steps 352 and 354 are repeated until there are no more records for the item.

A step 356, for each effect "E" with deviation set $D_e$, clusters the item-effect deviations. The mean and variance of these deviations within a cluster will be used as an item effect adjustment to Lambda. The adjustments are computed over grouped, or clustered, effect values to improve the stability of the adjustments, by applying a 2-sample K-S test to the sets of deviations for each pair of adjacent effect values that have non-empty $D_e$ sets. Unless the K-S probability is less than a variable threshold "Z" (the default value is Z=0.01), which is determined at a decision step 358, combine the two sets at a step 360. It will be understood that different default values for Z could be used without departing from the principles of the present invention. A decision step 362 determines whether or not there is only a single remaining step. If not, then steps 356 through 360 are repeated until there is just one set, or no remaining pair of sets for adjacent effect values having a K-S probability less than Z. The functions of step 356 are repeated for each effect E. The results are groups of effect sets with similar behavior; that is, within the group of effects, the deviations D from the Base Lambda are similar, and the same adjustment will be made to Lambda.

A step 364 now calculates the mean D for each remaining set. After that occurs, a step 366, for each pair of sets, and in decreasing magnitude of mean D, applies the 2-sample K-S test, using the individual D values (not the means) for each set. Unless the K-S probability is less than Z (again, the default value of Z=0.01), which is determined at a decision step 368, combine the sets at a step 370. A decision step 372 now determines whether or not any further sets can be combined, and if so steps 366 through 370 are repeated until no more sets can be combined according to the K-S test against threshold Z.

A step 374 saves an Alpha adjustment value of (1+(mean D÷Base Lambda)) and the variance of this D for each clustered group of effects in the Adjustment Alpha Table, indexed by the corresponding effects comprising that effect group as determined in the clustering procedure above. The Adjustment Alpha is used as described above as a multiplier on Base Lambda. Steps 352 through 374 are repeated for each item.

The values in the Adjustment Alpha Table represent average adjustments to a Poisson model for inter-arrival times with parameter Base Lambda. The accuracy of the model is improved by using Base Lambda times Adjustment Alpha from the Adjustment Alpha Table in place of previous Base Lambda values. The variance in the Adjustment Alpha Table is used to ascertain the goodness-of-fit of the model. If the variance is large, then the fit is not good, and various thresholds are automatically loosened.

Figure 6:
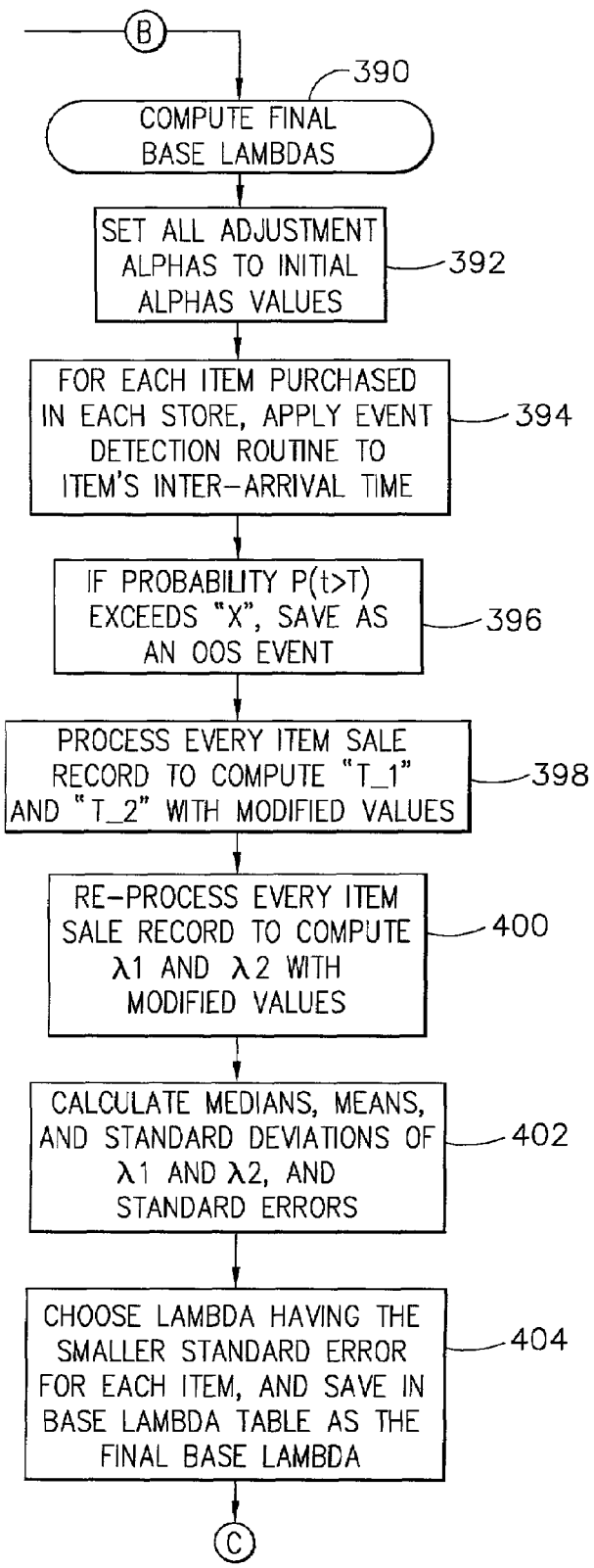
FIG. 6 is a flow chart of some of the detailed logical and mathematical operations performed by the item velocity monitoring system of FIG. 1, showing further intermediate steps to train the OOS Detector.

A step 390 (now referring to FIG. 6) signifies the beginning point of the fourth pass of training, which computes the Final Base Lambdas. Since this training pass will utilize many steps previously described above, much of the logical and mathematical operations are iterative, and typically the same functions will be performed on each item record or combination item/store record, one at a time.

At a step 392, all adjustment Alphas are set to their Initial Adjustment Alphas from the hash table (and not the default Alpha values used previously). Then for each store, and for each item purchased, a step 394 applies the "OOS event detection routine" (discussed in greater detail in reference to FIG. 9) to the item's inter-arrival time, using the Initial Base Lambda times the default Alpha. A computed probability variable will now be used, referred to herein as "P(t>T)," which represents the computed probability of the Poisson inter-arrival time t being shorter than the observed inter-arrival time T.

A step 396 now determines the following: if P(t>T) is less than "X", then save this information as an OOS event for the store-item using a logic routine described in greater detail in reference to FIG. 10. The default value of X preferably is set to 0.005, however, this value can be changed when the system is installed or maintained. The default value of 0.005 results in a low false alarm rate, but more OOS events are "missed" (i.e., they are not determined or "announced" as being an OOS event). The functions performed by steps 394 and 396 are repeated until there is no more historical data for the store. The historical transaction database pointer is now reset to the first item record for this store.

A step 398 now processes every item sale record according to steps 312 through 318, with the following modifications: if any OOS event time intervals saved in step 336 for the item overlaps the current inter-arrival time interval, then (1) subtract the store sales during the OOS event from stores sales in step 320, and (2) subtract the category sales during the OOS event from category sales in step 320, to compute T_1 and T_2 with modified values. In addition, a step 400 re-processes every item sale record according to steps 312 through 318, with the same modifications as above, to compute lambda_1 and lambda_2 with modified values.

For each item, a step 402 uses the sums, medians, and sums of squares of lambda_1 and lambda_2 to calculate their means and standard deviations, and from these, the standard errors. A step 404 now chooses the lambda with the smaller standard error for each item in the store. This value is saved in the Base Lambda Table as the Intermediate Base Lambda for the store-item. Finally, this fourth training pass is completed by emptying the OOS event table, and repeating steps 394 through 404 until there are no more stores.

Figure 7:
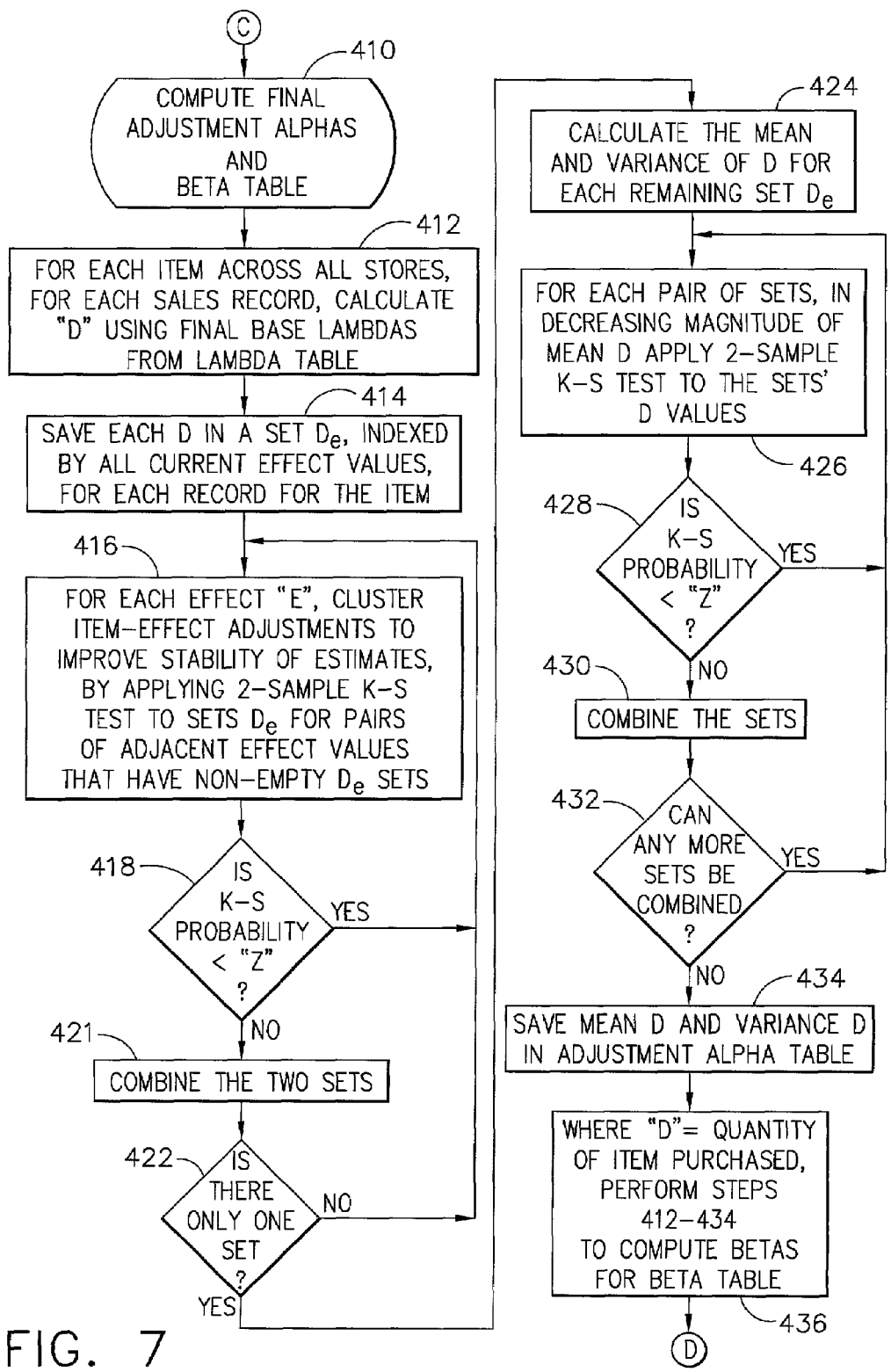
FIG. 7 is a flow chart of some of the detailed logical and mathematical operations performed by the item velocity monitoring system of FIG. 1, showing yet further intermediate steps to train the OOS Detector.

A step 410 (now referring to FIG. 7) signifies the beginning point of the fifth pass of training, which computes the Final Adjustment Alphas and a "Beta Table." As before in the third pass of training, much of the logical and mathematical operations are iterative, and typically the same functions will be performed on each item record or combination item/store record, one at a time, although in some cases, calculations will involve all stores for a particular item.

The deviations computed in steps 352-374 (see FIG. 5) are now re-computed based upon deviations from the Final Base Lambdas. Beginning with a step 412, for each item across all stores, and for each sale record for the item, deviations D of the actual inter-arrival times are calculated for every item, using Final Base Lambdas from the Lambda Table created in step 404. At a step 414, these deviations for each effect are saved in a set $D_e$ indexed by the effect values (price, promotion, season, time-of-day, day-of-week, holiday, market conditions) re-using the hash table to store the D values for each set $D_e$. All effect values (e.g., the 6-digit Boolean promotion string) are treated as if they were ordered values, as opposed to categorical values. Steps 412 and 414 are repeated until there are no more records for the item.

A step 416, for each effect "E" with deviation set $D_e$, clusters the item-effect deviations. The mean and variance of these deviations within a cluster will be used as an item effect adjustment to Lambda. The adjustments are computed over grouped, or clustered, effect values to improve the stability of the adjustments, by applying a 2-sample K-S test to the sets of deviations for each pair of adjacent effect values that have non-empty $D_e$ sets. Unless the K-S probability is less than a variable threshold "Z" (the default value is Z=0.01), which is determined at a decision step 418, combine the two sets at a step 420. It will be understood that different default values for Z could be used without departing from the principles of the present invention. A decision step 422 determines whether or not there is only a single remaining step. If not, then steps 416 through 420 are repeated until there is just one set, or no remaining pair of sets for adjacent effect values having a K-S probability less than Z. The functions of step 416 are repeated for each effect E. The results are groups of effect sets with similar behavior; that is, within the group of effects, the deviations D from the Base Lambda are similar, and the same adjustment will be made to Lambda.

A step 424 now calculates the mean D for each remaining set. After that occurs, a step 426, for each pair of sets, and in decreasing magnitude of mean D, applies the 2-sample K-S test, using the individual D values (not the means) for each set. Unless the K-S probability is less than Z (again, the default value of Z=0.01), which is determined at a decision step 428, combine the sets at a step 430. A decision step 432 now determines whether or not any further sets can be combined, and if so steps 416 through 420 are repeated until no more sets can be combined according to the K-S test against threshold Z.

A step 434 saves an Alpha adjustment value of (1+(mean D÷Final Base Lambda)) and the variance of this D for each clustered group of effects in the Adjustment Alpha Table, indexed by the corresponding effects comprising that effect group as determined in the clustering procedure above. The Adjustment Alpha is used as described above as a multiplier on Final Base Lambda. Steps 412 through 434 are repeated for each item.

At step 436 now computes Betas in the same manner as the Alphas, using steps 412 through 434, except that D now represents the quantity of item purchased in a transaction. The Beta values thereby computed are placed into a Beta Table.

Figure 8:
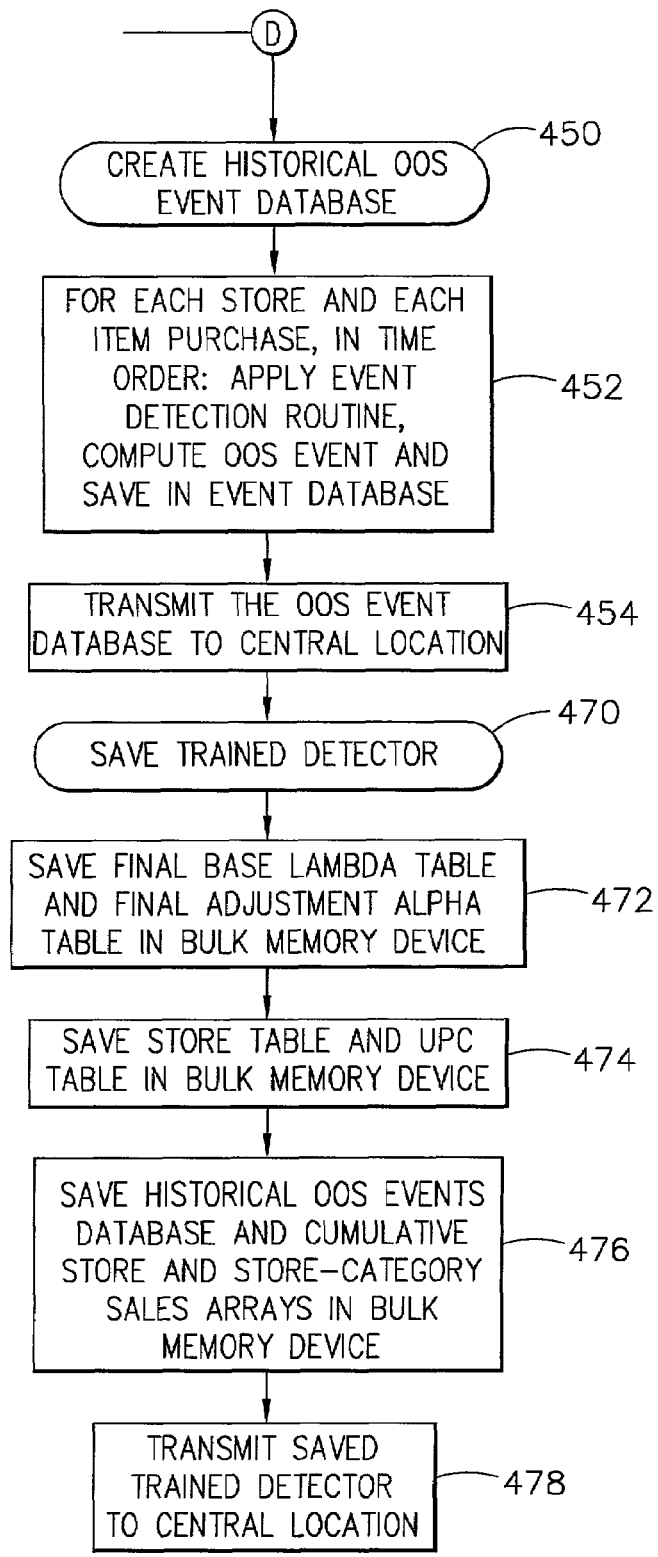
FIG. 8 is a flow chart of some of the detailed logical and mathematical operations performed by the item velocity monitoring system of FIG. 1, showing final steps to train the OOS Detector.

A step 450 signifies the starting point of a procedure that creates a "Historical OOS Event Database," now in reference to FIG. 8. For every store in the historical transaction database, and for every item purchase for the store, and in time order, a step 452 calls for the execution of the Event Detection Routine (found at step 500 on FIG. 9) and of the Compute OOS Event Attributes routine (found at step 550 on FIG. 10). The Event Detection Routine 500 and Compute OOS Event Attributes routine 550 are continued until there are no more item purchases records for the store. This functional step 452 is continued until there are no more stores to be processed. Preferably, a step 454 now transmits the OOS Event Database to a central location for further analysis.

A step 470 signifies the starting point in saving the Trained Detector in a computer memory. A step 472 saves the Final Base Lambda Table to disk for future use, and saves the Final Adjustment Alpha Table to disk for future use. A step 474 saves the Store Table to disk for future use, and saves the UPC table to disk for future use. A step 476 saves the Historical OOS Events Database to disk for future use, and saves the cumulative store and store-category sales arrays to disk for future use. It will be understood that any type of computer bulk memory storage device could be used for storing these various tables and databases, without departing from the principles of the present invention. Obviously, a magnetic hard disk drive is a logical choice in view of its relatively quick access times and its large storage capacity. Certainly optical read/write memory devices could also be suitable, especially for very large data sizes, and in view of the faster access time that will undoubtedly by available in the future. An optional step 478 will preferably now transmit the saved, trained detector to a central location for use in recovery if the monitor system is later lost.

Detect OOS Event

Figure 9:
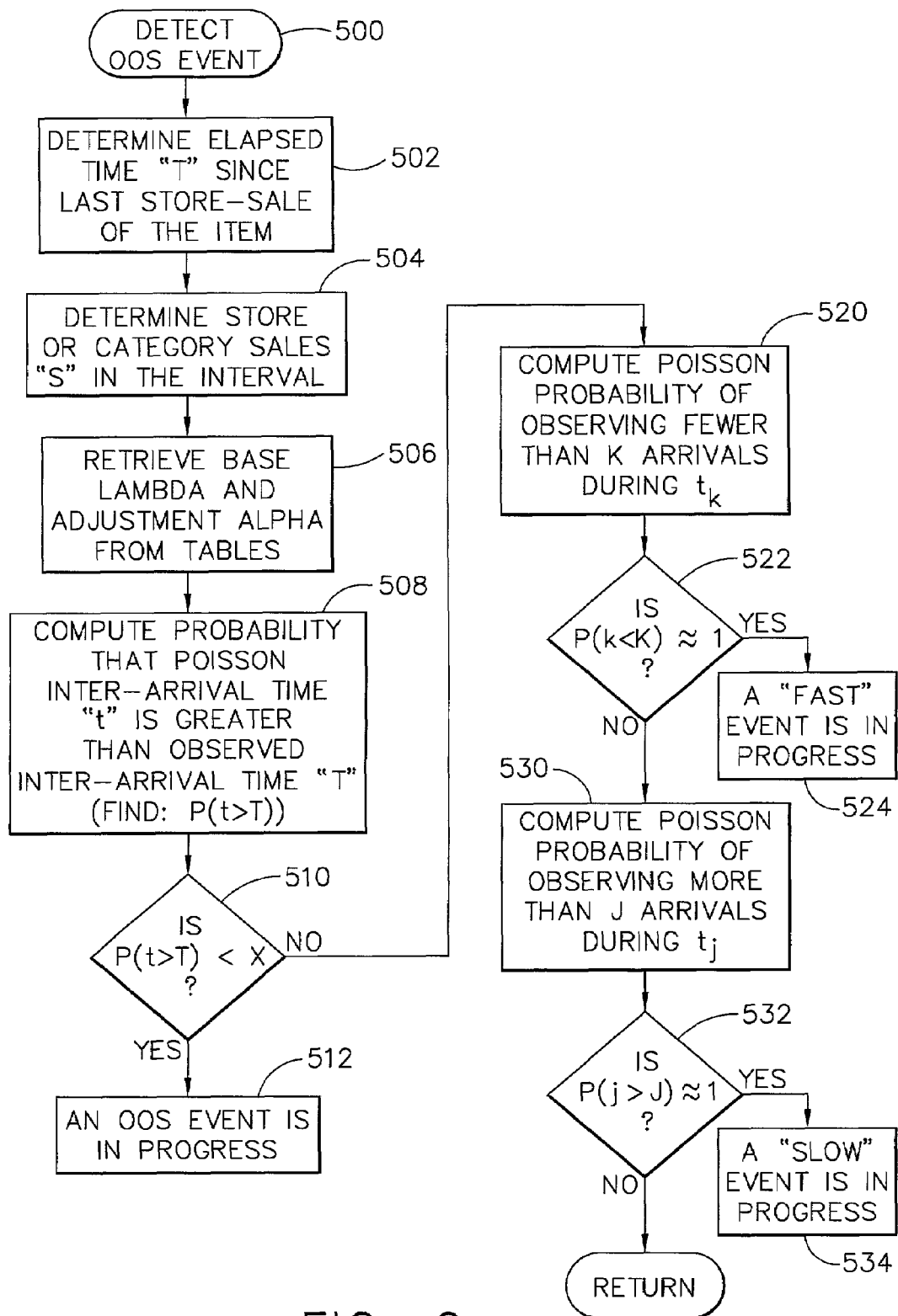
FIG. 9 is a flow chart of some of the detailed logical and mathematical operations performed by the item velocity monitoring system of FIG. 1, showing steps to detect an OOS Event.

A step 500 on FIG. 9 signifies the beginning of a routine that detects an OOS event. The first operation at a step 502 is to determine the elapsed time "T" since the last store-sale of a particular item. A step 504 then determines the store or category sales "S" in the interval, depending on whether the Base Lambda for the item used the store or category sales. A step 506 then retrieves the Base Lambda and Adjustment Alpha from the corresponding tables.

A step 508 now computes the probability that the Poisson inter-arrival time "t" is greater than the observed inter-arrival time "T." In other words, step 508 finds P(t>T). A decision step 510 then determines if P(t>T) is less than X, typically about 0.999. If the answer is YES, then an OOS event is in progress at a step 512.

A new variable referred to as "$t_k$" represents the elapsed time for the (most recent) past "k" arrivals of the same item. If the answer at decision step 510 was NO, then a step 520 computes the Poisson probability of observing fewer than "K" arrivals during the time interval $t_k$. If a decision step 522 determines that this probability is significantly large (approaching 1.0, for example), then a step 524 concludes that a "fast" event in is progress.

On the other hand, if decision step 522 determines that the probability was not "large," then the logic flow is directed to a step 530. A new variable referred to as "$t_j$" represents the elapsed time for the (most recent) past "j" arrivals of the same item. Step 530 now computes the Poisson probability of observing more than "J" arrivals during the time interval $t_j$. If a decision step 532 determines that this probability is significantly large (approaching 1.0, for example), then a step 534 concludes that a "slow" event in is progress. If the result at decision step 532 was NO, then the routine of FIG. 9 returns.

The values for J and K can be set to the same number, as was the case in the above-described example. However, they can be independently evaluated and set to different numbers, if desired. As an exemplary value, if Lambda is well known, then J and K can both be set to 5. However, if Lambda is not yet well known, then J and K should be set to larger values than 5. In decision steps 522 and 532, the mathematical comparison can be such that a value of 0.99 or 0.999 is used to determine whether or not a probability is "large."

It will be understood that many numeric values could be used other than those presented above without departing from the principles of the present invention. These are exemplary values, which have produced good results in preliminary testing. Moreover, the value for J could be modified in real time if a it requires a very long time before the past "j" arrivals of the same item actually occurs—in fact, J could be set to "1" if necessary, in order to provide at least some preliminary results for a particular item that is moving very slowly. Of course, the time interval $t_j$ would be affected by this change of value for J.

Computing OOS Event Attributes

A step 550 on FIG. 10 signifies the starting point of a routine that computes OOS event attributes and saves them in an Event Database. A step 552 begins by filling in the OOS event data structure as defined in hereinabove. A step 554 then appends the OOS event to the OOS Event Database. A step 556 now triggers any alarms and/or displays the event as defined by an application (POS Monitor) user interface.

Use of the median is an important aspect of the probability model, as it enables the system to get a good estimate of what the "true" item movement velocity would be in the absence of any historical OOS events. The arrival rate (movement velocity) is modeled by a Poisson distribution. The relationship between the true mean (E) and the true median (M) of this model is E=M/(natural log 2)=M/(0.693). The system relies on this "true relationship" to improve its estimates of the model probability velocity. The median is much less sensitive to distortions produced by historical OOS events.

Notwithstanding the improvements obtained by using the median, the system later recomputes medians, means, and variances for the historical data after removing historical OOS events detected in the historical data on an initial training run. This initial pass, plus the use of medians, enables to system to remove most of the effects of historical OOS events from the model probability velocities. This enables it to detect fast, slow, and OOS events, and to make better short-term (e.g., 1 to 7 days out) item sales forecasts.

The use of the median to estimate the model parameter Lambda reduces bias in the estimate of the true Lambda parameter that otherwise arises from the contaminating effect of historical OOS events.

Read New POS Data

A step 600 on FIG. 10 signifies the starting point of a routine that reads in new point-of-sale data. Beginning at a step 602, transaction data is acquired from the POS system (e.g., the POS store controller 60 on FIG. 1). A step 604 now converts the acquired transaction data to a canonical format. A step 606 then updates the store and/or category sales arrays. A step 608 updates event attributes, and the revised event is saved. Now a step 610 terminates any ongoing OOS event for this store-item.

Detect New OOS Events

A step 650 on FIG. 10 signifies the starting point of a routine that detects new Out of Stock Events, and saves these event in the Events Database on a periodic basis (such as every 10 minutes). For each store and each item, a step 652 periodically calls for further action, such as every 10 minutes (although this time parameter could certainly be altered without departing from the principles of the present invention).

A step 654 then executes the "Detect OOS Event" module (or routine) at step 500 on FIG. 9. A decision step 656 now determines whether or not an OOS Event was detected. If an OOS event was detected, then a step 658 executes the "Compute OOS Event Attributes" module at step 550 on FIG. 10.

It is preferred that the updated OOS events are periodically transmitted to a central location for retention and further analysis, at a step 670. This should occur several times per day, perhaps on an hourly basis. This routine 650 then returns at a step 672.

Summarize Event Data

A step 700 on FIG. 10 signifies the beginning of a tabulation of several parameters and system calculated datum points. At a step 702, the following information is tabulated:

Total Number of Events;
Average Duration;
Average Loss;
Service Level.

These above information is further tabulated by store, by category, by distribution center, by Day-of-Week and Hour-of-Day, by major brand (e.g., if a brand accounts for more than 1% of a store's sales).

In addition to the above features provided by the present invention, the preferred LOSS is also capable of discovering causes of OOS events and determining impacts of OOS events, as related hereinabove in detail. Moreover, the preferred LOSS is capable of retraining the OOS Detector every 24 hours (or other time interval), if desired. This, too, is discussed hereinabove in detail in the above section referred to as "Daily Re-training."

Figure 14:
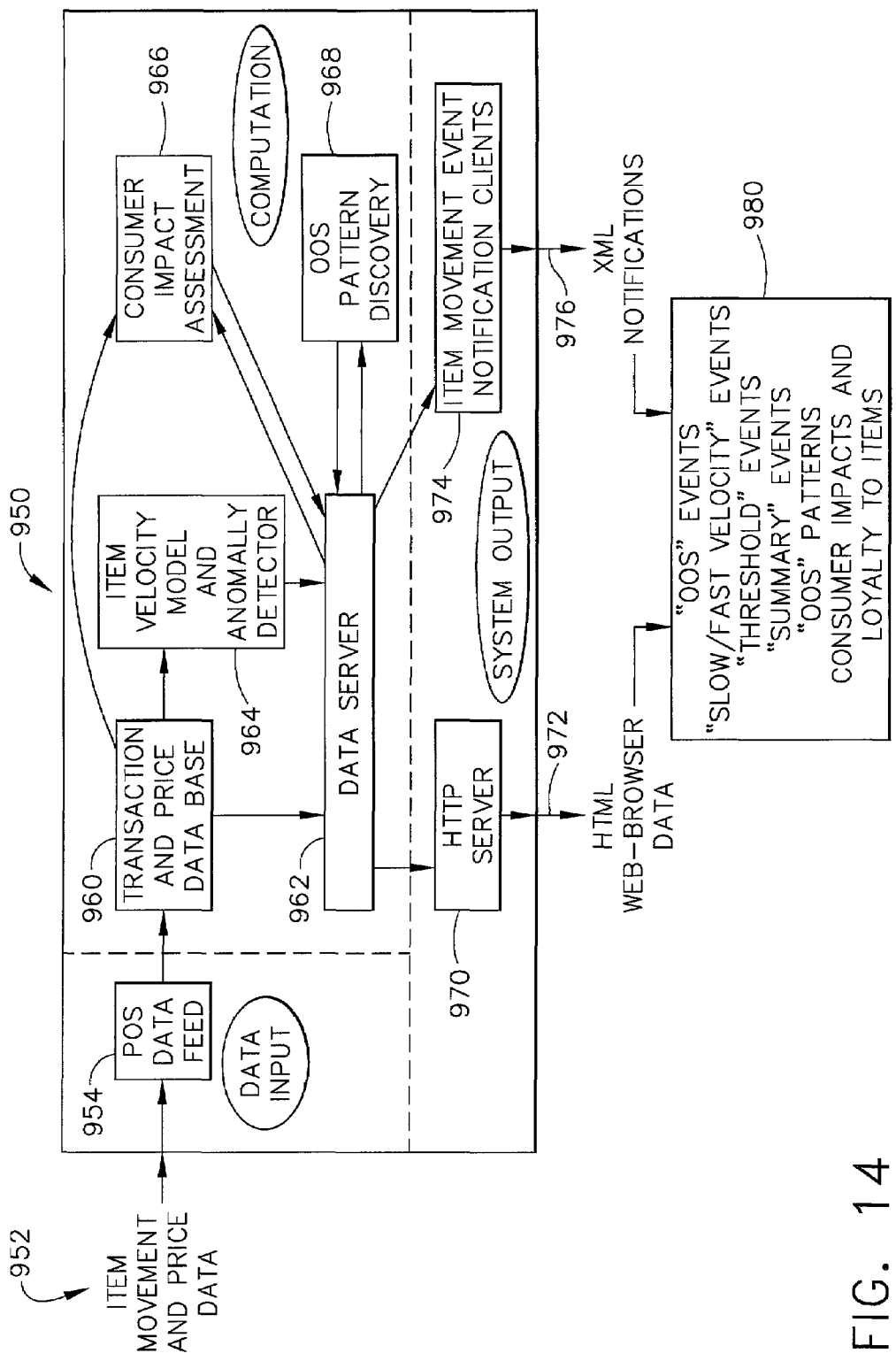
FIG. 14 is a block diagram of the major components of a preferred embodiment of an item velocity monitoring system, showing both hardware components and major software functions, as constructed according to the principles of the present invention.

Referring now to FIG. 14, a block diagram of major components of a preferred Loyalty Out-of-Stock System (LOSS), generally designated by the reference numeral 950, is provided. This system 950 includes a data feed module, a transaction database, an item velocity model and anomaly detection module, a data server, an item movement event notification client, and a world-wide-web http server.

The data that is input to the LOSS 950 arrives at a communication link 952, and this data includes both item movement and price information. A POS data feed module 954 received this information via a communication port, which make up a "data input" stage of the LOSS 950.

A "computation" stage of LOSS 950 is essentially the heart of the system. Data is received from the POS data feed module 954 at a "transaction and price database" 960, which then feeds data, as needed, to various other software modules of LOSS 950. One of these software modules is an "item velocity model and anomaly detector" 964, while a second of these software modules is a "consumer impact assessment" module 966. The transaction and price database 960 also feeds data to a data server function or module 962, which provides information as needed to other modules or hardware components.

The various software modules (or functions) each receive data and generate data that must be stored in a memory circuit of some type. For example, the transaction and price database 960 and the data server 962 modules need to store data on one or more hard disk drives, or other type of memory storage device (such as an optical memory unit), which are used for non-volatile memory storage of the relatively large quantities of information used by the LOSS 950. While portions of the database 960 will reside in RAM (not shown) during data accesses by the system 950, it would not be typical for the entire database 960 to reside in RAM at one time (although it could if sufficient RAM were provided).

The item velocity model and anomaly detector module 964 also provides data to the data server module 962. The consumer impact assessment module 966 both provides data to and makes inquiries from the data server module 962. This consumer impact assessment module 966 is optional in the LOSS overall system 950. If present, the consumer impact assessment module 966 would normally reside on the same computer as the transaction and price database 960, item velocity model and anomaly detector 964, and data server 962.

Another component of the computation stage is an Out-of-stock pattern discovery module 968 (the OOS pattern discovery module), which also in an optional component in the LOSS overall system 950. This OOS pattern discovery module 968, if present, will preferably reside on a centralized computer (not shown as a specific hardware component) where it has access to data served from multiple stores (or warehouses), so that it can "discover" multi-store patterns. However, the OOS pattern discovery module 968 is able to reside on the same computer as the transaction and price database 960, item velocity model and anomaly detector 964, and data server 962—in that event, the OOS pattern discovery module 968 may be able to "discover" patterns only for a single store (or warehouse), although the various modules of the computation stage can each handle data for multiple stores, so long as they are placed in communication with those multiple stores (or warehouses). The data server module 962 and OOS pattern discovery module 968 communicate with each other in both directions.

The data server module 962 can pass data to a "system output" stage of the LOSS 950. This system output stage includes an HTTP server 970, which outputs data in an HTML web-browser format at 972, and an "item movement event notification client" module 974, which outputs data as XML notifications at 976.

Both types of output messages (i.e., the HTML web-browser data 972 and the XML notifications 976) contain various types of information, including: "OOS" events, "Slow/Fast Velocity" events, "Threshold" events, "Summary" events, "OOS patterns, and "consumer impacts" and "consumer loyalty to items" information. These various types of information are grouped at a block 980 on FIG. 14.

Some of the above-described system components must reside on the same computer platform: for example, the transaction and price database 960, item velocity model and anomaly detector module 964, and data server 962 must be so grouped. However, these three modules 960, 962, and 964 can be located at a store (for example, on the store's POS computer or other type of personal computer or PC), at a store chain's company headquarters, or at an application service provider's (ASP) location.

The POS data feed module 954 can reside on the retailer's store controller (or POS computer) or another PC at the store, or it could reside on the same computer platform at the above three modules 960, 962, and 964.

The HTTP server 970 also can reside on the same computer platform at the above three modules 960, 962, and 964. Alternatively, it could reside on its own computer platform or machine at a central location, if desired.

The item movement event notification client module 974 also can reside on the same computer platform at the above three modules 960, 962, and 964. Alternatively, it could reside on its own computer platform or machine at a central location, if desired. Moreover, it could reside on the same computer platform as the HTTP server 970.

The computation modules 960, 962, 964, 966, and 968 can handle multiple stores, if desired. Of course, the POS data feed module 954 would, in that case, need to be in communication with each of these desired stores. Naturally, these computation modules 960, 962, 964, 966, and 968 can be used for only a single store, if that is the desired configuration.

It will be understood that the principles of the present invention directly apply to retail stores (such as grocery stores), warehouses, stockrooms, and distribution points (such as those owned or operated by a manufacturer of consumer goods to supply those goods to various individual stores), as well as other applications where inventory items are disbursed according to a potentially varying, yet somewhat predictable rate over time, or a rate with respect to another characteristic or parameter.

It will be further understood that the logical operations described in relation to the flow charts of FIGS. 2-10 can be implemented using sequential logic, such as by using microprocessor technology or using a logic state machine for some operations; it even could be implemented using parallel logic. The preferred embodiment uses a microprocessor (e.g., microprocessor or CPU 22) to execute software instructions that are stored in memory cells, which could be part of an ASIC (Application Specific Integrated Circuit). In fact, the entire microprocessor 22 and operating software could be contained within a single ASIC, although a bulk memory storage device would additionally be required in a typical large data quantity system. Of course, other circuitry could be used to implement these logical operations depicted in FIGS. 2-10 without departing from the principles of the present invention.

It will be further understood that the precise logical operations depicted in the flow charts of FIGS. 2 through 10, and discussed hereinabove, could be somewhat modified to perform similar, although not exact, functions without departing from the principles of the present invention. The exact nature of some of the decision steps and other commands in these flow charts are directed toward specific types of retail stores, and certainly similar, but somewhat different, steps would be taken for use with other types of inventory-intensive systems in many instances, although the overall inventive results would be the same.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

The invention claimed is:

1. A method of using a computer processor to monitor items being received and disbursed within a predetermined environment, said method comprising:
   (a) providing a computer monitoring system having a memory circuit for storage of data, a communications port, and a processing circuit;
   (b) providing a plurality of sensing circuits that detect at least one item as it is moved to predetermined locations within said predetermined environment;
   (c) receiving, by way of said communications port, identification characteristic information pertaining to said at least one item as it passes one of said plurality of sensing circuits, and receiving an arrival time, wherein said arrival time is a time when said at least one item was detected by the one of said plurality of sensing circuits;
   (d) determining at a later time, by way of said processing circuit, a waiting time for said at least one item, wherein said waiting time is an amount of time between said arrival time and said later time, wherein said later time is prior to a next time said at least one item is again detected by one of said plurality of sensing circuits;
   (e) retrieving, from said memory circuit, a probability distribution over inter-arrival times for said at least one item, wherein an inter-arrival time is an amount of time between an arrival of said at least one item and a next arrival of said at least one item, and wherein said probability distribution is retrieved, by way of said processing circuit, based on said identification characteristic information; and
   (f) determining, by way of said processing circuit, based on said retrieved probability distribution, that said waiting time is anomalous if a cumulative probability of all inter-arrival times that are greater than said waiting time is less than a predetermined threshold; and
   (g) generating at said later time, by way of said processing circuit, an inter-arrival time event announcement for said at least one item whenever said waiting time is anomalous.

2. The method as recited in claim 1, further comprising updating said probability distribution over inter-arrival times for said at least one item after it passes one of said plurality of sensing circuits.

3. The method as recited in claim 1, further comprising storing said probability distribution in said memory circuit, wherein the step of storing said probability distribution in said memory circuit comprises: creating or modifying an entry in a database that is stored in said memory circuit such that said entry can later be accessed in substantially real time with respect to the occurrence of the step of determining, by way of said processing circuit, whether said waiting time is anomalous.

4. The method as recited in claim 1, wherein said identification characteristic information comprises: an SKU identifier of said at least one item, or a bar code from a label affixed to said at least one item.

5. The method as recited in claim 1, wherein the step of determining, by way of said processing circuit, whether said waiting time is anomalous occurs in substantially real time with respect to the occurrence of said step of determining a waiting time for said at least one item.

6. The method as recited in claim 1, wherein the step of receiving identification characteristic information pertaining to said at least one item as it passes one of said plurality of sensing circuits occurs when said at least one item is being sold at a point-of-sale register within said predetermined environment.

7. The method as recited in claim 1, wherein the step of generating an inter-arrival time event announcement when said waiting time is anomalous is indicative of one of the following conditions: (i) said at least one item is substantially hidden while residing in its correct location on a display shelf; (ii) said at least one item is completely out-of-stock on said display shelf; (iii) said at least one item has been placed at an incorrect location within said predetermined environment, or (iv) access to said at least one item has been substantially prevented by an obstruction.

8. The method as recited in claim 1, wherein said step of determining, by way of said processing circuit, whether said waiting time is anomalous comprises: comparing the waiting time of said at least one item to said probability distribution over inter-arrival times for said at least one item, while taking into consideration at least one of the following factors: varying price conditions, time of day, day of week, week of year, holidays, promotion activities, or competitive activities.

9. The method as recited in claim 1, wherein said step of determining whether or not said waiting time is anomalous comprises: comparing the waiting time of said at least one item to said probability distribution over inter-arrival times for said at least one item, while taking into consideration a usage history of items being disbursed and received.

10. The method as recited in claim 1, wherein, if no probability distribution over inter-arrivals times can be retrieved based on said identification characteristic information, then said at least one item is a new item, and a new item event is generated, and a probability distribution over inter-arrival times is created for said new item.

11. An item monitoring system, comprising:
   (a) a plurality of sensing circuits that detect at least one item as it is moved to predetermined locations within a predetermined environment;
   (b) a computer monitoring system, comprising:
      (i) a memory circuit for storage of data, said memory circuit containing a quantity of random access memory (RAM) and a bulk memory storage device;

(ii) a communications port that is connected to at least one of said sensing circuits and to said memory circuit; and (iii) a processing circuit that is configured to control the flow of data between said memory circuit and said communications port;

(c) said processing circuit also being configured to:

(i) receive, by way of said communications port, identification characteristic information pertaining to said at least one item as it passes one of said plurality of sensing circuits, and to receive an arrival time, wherein said arrival time is a time when said at least one item was detected by the one of said plurality of sensing circuits;

(ii) determine at a later time, by way of said processing circuit, a waiting time for said at least one item, wherein said waiting time is an amount of time between said arrival time and said later time, wherein said later time is prior to a next time said at least one item is again detected by one of said plurality of sensing circuits;

(iii) retrieve, from said memory circuit, a probability distribution over inter-arrival times for said at least one item, wherein an inter-arrival time is an amount of time between an arrival of said at least one item and a next arrival of said at least one item, and wherein said probability distribution is retrieved, by way of said processing circuit, based on said identification characteristic information; and (iv) determine, by way of said processing circuit, based on said retrieved probability distribution, whether said waiting time is anomalous if a cumulative probability of all inter-arrival times that are greater than said waiting time is less than a predetermined threshold; and (v) generate at said later time, by way of said processing circuit, an inter-arrival time event announcement for said at least one item whenever said waiting time is anomalous.

12. The item monitoring system as recited in claim 11, further comprising: a point-of-sale controller that is in communication with said plurality of sensing circuits and with said communications port.

13. The method as recited in claim 1, wherein said probability distribution comprises a modified Poisson distribution consisting of weighted sums of Poisson distributions.

14. The method as recited in claim 1, further comprising: detecting an out-of-stock event using a probability of observing zero arrivals of said at least one item during said waiting time for said at least one item.

15. The method as recited in claim 14, wherein said out-of-stock event comprises a time interval during which said at least one item appears to be physically out-of-stock, and upon the occurrence of said out-of-stock event, the computer monitoring system summarizes said out-of-stock events, determines their causes, and measures their effect on revenues, profits, substitute items, and customer behavior.

16. The method as recited in claim 14, wherein said computer monitoring system provides forecasting of inventory or replenishment levels that removes effects of out-of-stock events before generating forecasting reports.

17. The method as recited in claim 1, wherein said probability distribution is determined by training said computer monitoring system by use of one of: (i) historical transaction data, or (ii) transaction data that is gathered in substantially real time.

18. The method as recited in claim 17, wherein said training of the computer monitoring system occurs in a plurality of iterative passes to create: a Final Base Lambda Table, a Final Adjustment Alpha Table, a Store Table, and a UPC Table or Item Table.

19. The method as recited in claim 1, wherein all said times are redefined in terms of measured cumulative activity in said predetermined environment, and wherein said measured cumulative activity is one of (i) quantity of packaged items sold or processed, (ii) sales in monetary units, or (iii) number of different items in each transaction at a point of sale.

20. The method as recited in claim 1, wherein all said times are redefined in terms of measured cumulative activity in one of a retail store or a category of items in a retail store.

21. The method as recited in claim 1, wherein said probability distribution over inter-arrival times is a Poisson distribution with a parameter lambda that is a function of Base Lambda and Adjustment Alpha, which include information as saved data and lookup tables on: SKU, store, and various effects, including price point, promotion, season, holiday, time-of-day, day-of-week, and market conditions.

22. The method as recited in claim 21, wherein a median is used to estimate said parameter lambda, thereby reducing bias in an estimate of a true parameter lambda arising from a contaminating effect of historical out-of-stock events.

23. The method as recited in claim 1, wherein each inter-arrival time for said at least one item and a quantity of said at least one item are linked together as a renewal-reward process, in which the quantity of said at least one item is a separate random log-normal variable with a mean beta and a beta variance.

24. The method as recited in claim 23, wherein said mean and variance parameters to the renewal-reward process are not constants, but vary during the inter-arrival time as conditions at said predetermined environment change.

25. The method as recited in claim 1, further comprising: detecting a slow event using a probability of observing more than K arrivals of said at least one item in the time actually observed for K arrivals of said at least one item.

26. The method as recited in claim 1, further comprising: detecting a fast event using a probability of observing less than J arrivals of said at least one item in the time actually observed for J arrivals of said at least one item.

27. The method as recited in claim 1, wherein each inter-arrival time for said at least one time varies as a function of: total predetermined environment traffic, item category traffic, time of day, day of week, season, holidays, and market conditions of said predetermined environment.

28. The method as recited in claim 1, wherein said predetermined environment comprises one of: a retail store, a chain of retail stores, a warehouse, a chain of warehouses, a distribution point, a chain of distribution points, manufacture's distribution center or a chain of manufacture's distribution centers.

29. The method as recited in claim 17, further comprising: automatically re-training said computer monitoring system on a periodic basis using substantially real time data throughout a periodic interval.

30. The method as recited in claim 29, wherein said re-training of the computer monitoring system occurs in a plurality of iterative passes to create: a Final Base Lambda Table, a Final Adjustment Alpha Table, a Store Table, and a UPC Table.

31. The method as recited in claim 30, wherein said iterative passes comprise:

(i) computing Initial Base Lambdas using total store sales and total category sales; (ii) computing Intermediate Base Lambdas using item transaction data and said item's inter-arrival time using said Initial Base Lambdas; (iii) computing Initial Adjustment Alphas using an adjusted item inter-arrival time and a plurality of current effects; (iv) computing Final Base Lambdas using said Initial Adjustment Alphas and using said item transaction data and said item's inter-arrival time; and (v) computing Final Adjustment Alphas using said Final Base Lambdas and a plurality of current effects, and computing a Beta Table.

32. The method as recited in claim 31, wherein said Final Base Lambda Table, Final Adjustment Alpha Table, Store Table, and UPC Table are used to calculate a probability distribution of inter-arrival times for said at least one item, and wherein said inter-arrival time is stated either in units of: (i) time, or (ii) quantity of sales in monetary units.

33. The item monitoring system as recited in claim 11, said processing circuit also being configured to: update said probability distribution over inter-arrival times for said at least one item after it passes one of said plurality of sensing circuits.

34. The item monitoring system as recited in claim 11, wherein said processing circuit is further configured to detect an out-of-stock event using a probability of observing zero arrivals of said at least one item during said waiting time for said at least one item.

35. The item monitoring system as recited in claim 34, wherein said out-of-stock event comprises a time interval during which said at least one item appears to be physically out-of-stock, and upon the occurrence of said out-of-stock event, the computer monitoring system summarizes said out-of-stock events, determines their causes, and measures their effect on revenues, profits, substitute items, and customer behavior.

36. The item monitoring system as recited in claim 11, wherein said probability distribution is determined by training said computer monitoring system by use of one of: (i) historical transaction data, or (ii) transaction data that is gathered in substantially real time.

37. The item monitoring system as recited in claim 36, wherein said training of the computer monitoring system occurs in a plurality of iterative passes to create: a Final Base Lambda Table, a Final Adjustment Alpha Table, a Store Table, and a UPC Table.

38. The item monitoring system as recited in claim 11, wherein all said times are redefined in terms of measured cumulative activity in said predetermined environment, and wherein said measured activity is one of (i) quantity of packaged items sold or processed, (ii) sales in monetary units, or (iii) number of different items in each transaction at a point of sale.

39. The item monitoring system as recited in claim 11, wherein each inter-arrival time for said at least one item and a quantity of said at least one item are linked together as a renewal-reward process, in which the quantity of said at least one item is a separate random log-normal variable with a mean beta and a beta variance.

40. The item monitoring system as recited in claim 11, wherein each inter-arrival time for said at least one item varies as a function of: total predetermined environment traffic, item category traffic, time of day, day of week, season, holidays, and market conditions of said predetermined environment.

41. The item monitoring system as recited in claim 11, wherein said predetermined environment comprises one of: a retail store, a chain of retails stores, a warehouse, a chain of warehouses, a distribution point, or a chain of distribution points.

42. The item monitoring system as recited in claim 11, wherein said processing circuit is further configured to automatically re-train said computer monitoring system on a periodic basis using substantially real time data throughout a periodic interval.

43. The item monitoring system as recited in claim 42, wherein said re-training of the computer monitoring system occurs in a plurality of iterative passes to create: a Final Base Lambda Table, a Final Adjustment Alpha Table, a Store Table, and a UPC Table.

44. The item monitoring system as recited in claim 43, wherein said iterative passes comprise: (i) computing Initial Base Lambdas using total store sales and total category sales; (ii) computing Intermediate Base Lambdas using item transaction data and said item's inter-arrival time using said Initial Base Lambdas; (iii) computing Initial Adjustment Alphas using an adjusted item inter-arrival time and a plurality of current effects; (iv) computing Final Base Lambdas using said Initial Adjustment Alphas and using said item transaction data and said item's inter-arrival time; and (v) computing Final Adjustment Alphas using said Final Base Lambdas and a plurality of current effects, and computing a Beta Table.

45. The item monitoring system as recited in claim 44, wherein said Final Base Lambda Table, Final Adjustment Alpha Table, Store Table, and UPC Table are used to calculate a probability distribution over inter-arrival times for said at least one item, and wherein said inter-arrival time is stated either in units of: quantity or sales in monetary units.

46. The item monitoring system as recited in claim 11, said processing circuit also being configured to store said probability distribution in said memory circuit, wherein said memory circuit creates or modifies an entry in a database that is stored in said memory circuit such that said entry can later be accessed in substantially real time with respect to when said processing circuit determines whether said waiting time is anomalous.

47. The item monitoring system as recited in claim 11, wherein said identification characteristic information comprises: an SKU identifier of said at least one item, or a bar code from a label affixed to said at least one item.

48. The item monitoring system as recited in claim 11, wherein said processing circuit determines whether said waiting time is anomalous in substantially real time with respect to when said processing circuit determines a waiting time for said at least one item.

49. The item monitoring system as recited in claim 11, wherein said processing circuit receives identification characteristic information pertaining to said at least one item as it passes one of said plurality of sensing circuits occurs when said at least one item is being sold at a point-of-sale register within said predetermined environment.

50. The item monitoring system as recited in claim 11, said processing circuit generating an inter-arrival time event announcement when said waiting time is anomalous is indicative of one of the following conditions: (i) said at least one item is substantially hidden while residing in its correct location on a display shelf (ii) said at least one item is completely out-of-stock on said display shelf (iii) said at least one item has been placed at an incorrect location within said predetermined environment, or (iv) access to said at least one item has been substantially prevented by an obstruction.

51. The item monitoring system as recited in claim 11, wherein said processing circuit is further configured to determine whether said waiting time is anomalous by comparing said waiting time of said at least one item to said probability distribution over inter-arrival times for said at least one item, while taking into consideration at least one of the following factors: varying price conditions, time of day, day of week, week of year, holidays, promotion activities, or competitive activities.

52. The item monitoring system as recited in claim 11, wherein said processing circuit is further configured to determine whether or not said waiting time is anomalous by comparing said waiting time of said at least one item to said probability distribution over inter-arrival times for said at least one item, while taking into consideration a usage history of items being disbursed and received.

53. The item monitoring system as recited in claim 11, wherein if no probability distribution over inter-arrivals times can be retrieved based on said identification characteristic information, then said at least one item is a new item, and a new item event is generated and a probability distribution over inter-arrival times is created for said new item.

54. The method as recited in claim 1, wherein when said waiting time is stated in units of quantity, said quantity is stated in terms of either the number of unique items sold or the total number of items sold.

55. The item monitoring system as recited in claim 11, wherein when said waiting time is stated in units of quantity, said quantity is stated in terms of either the number of unique items sold or the total number of items sold.

56. The method as recited in claim 1, wherein information upon which said probability distribution is retrieved is further comprised of interval information, wherein said interval information is comprised of information about one or more conditions occurring during said waiting time.

57. The method as recited in claim 56, wherein said information about one or more conditions occurring during said waiting time is comprised of information about varying price conditions, time of day, day of week, week of year, holidays, promotion activities, or competitive activities.

58. The item monitoring system as recited in claim 11, wherein information upon which said probability distribution is retrieved is comprised of on interval information, wherein said interval information is comprised of information about one or more conditions occurring during said waiting time.

59. The item monitoring system as recited in claim 58, wherein said information about one or more conditions occurring during said waiting time is comprised of information about varying price conditions, time of day, day of week, week of year, holidays, promotion activities, or competitive activities.

60. A method of using a computer processor to monitor items being received and disbursed within a predetermined environment, said method comprising:
(a) providing a computer monitoring system having a memory circuit for storage of data, a communications port, and a processing circuit;
(b) providing a plurality of sensing circuits that detect at least one item as it is moved to predetermined locations within said predetermined environment;
(c) receiving, by way of said communications port, identification characteristic information pertaining to said at least one item as it passes one of said plurality of sensing circuits;
(d) receiving, by way of said communications port, a first arrival time, wherein said first arrival time is a first time when said at least one item was detected by the one of said plurality of sensing circuits;
(e) receiving, by way of said communications port, a second arrival time, wherein said second arrival time is a next time said at least one item is again detected by one of said plurality of sensing circuits, and wherein said second arrival time is later than said first arrival time;
(f) determining at a later time, by way of said processing circuit, an observed inter-arrival time for said at least one item, wherein said observed inter-arrival time is an amount of time between said first arrival time and said second arrival time;
(g) retrieving, from said memory circuit, a probability distribution over inter-arrival times for said at least one item, wherein an inter-arrival time is an amount of time between an arrival of said at least one item and a next arrival of said at least one item, and wherein said probability distribution is retrieved, by way of said processing circuit, based on said identification characteristic information;
(h) determining, by way of said processing circuit, based on said retrieved probability distribution, that said observed inter-arrival time is anomalous if a cumulative probability of all inter-arrival times that are less than said observed inter-arrival time is less than a predetermined threshold; and
(i) generating at said later time, by way of said processing circuit, an inter-arrival time event announcement for said at least one item whenever said observed inter-arrival time is anomalous.

61. The method as recited in claim 60, further comprising:
(j) repeating steps (d)-(g) for one to six, additional, consecutive arrivals of said at least one item;
and wherein the step of determining, by way of said processing circuit, based on said retrieved probability distribution, that said observed inter-arrival time is anomalous is based on said one to six, additional, consecutive arrivals of said at least one item.

62. The method as recited in claim 60, further comprising:
(j) repeating steps (d)-(g) for three, additional, consecutive arrivals of said at least one item;
and wherein the step of determining, by way of said processing circuit, based on said retrieved probability distribution, that said observed inter-arrival time is anomalous is based on said three, additional, consecutive arrivals of said at least one item.

63. An item monitoring system, comprising:
(a) a plurality of sensing circuits that detect at least one item as it is moved to predetermined locations within a predetermined environment;
(b) a computer monitoring system, comprising:
(i) a memory circuit for storage of data, said memory circuit containing a quantity of random access memory (RAM) and a bulk memory storage device;
(ii) a communications port that is connected to at least one of said sensing circuits and to said memory circuit; and
(iii) a processing circuit that is configured to control the flow of data between said memory circuit and said communications port;
(c) said processing circuit also being configured to:
(i) receive, by way of said communications port, identification characteristic information pertaining to said at least one item as it passes one of said plurality of sensing circuits;

(ii) receive, by way of said communications port, a first arrival time, wherein said first arrival time is a first time when said at least one item was detected by the one of said plurality of sensing circuits;

(iii) receive, by way of said communications port, a second arrival time, wherein said second arrival time is a next time said at least one item is again detected by one of said plurality of sensing circuits, and wherein said second arrival time is later than said first arrival time;

(iv) determine at a later time, by way of said processing circuit, an observed inter-arrival time for said at least one item, wherein said observed inter-arrival time is an amount of time between said first arrival time and said second arrival time;

(v) retrieve, from said memory circuit, a probability distribution over inter-arrival times for said at least one item, wherein an inter-arrival time is an amount of time between an arrival of said at least one item and a next arrival of said at least one item, and wherein said probability distribution is retrieved, by way of said processing circuit, based on said identification characteristic information;

(vi) determine, by way of said processing circuit, based on said retrieved probability distribution, that said observed inter-arrival time is anomalous if a cumulative probability of all inter-arrival times that are less than said observed inter-arrival time is less than a predetermined threshold; and (vii) generate at said later time, by way of said processing circuit, an inter-arrival time event announcement for said at least one item whenever said observed inter-arrival time is anomalous.

64. The method as recited in claim 1, further comprising: providing a point-of-sale controller that is in communication with said plurality of sensing circuits and with said communications port.

65. The method as recited in claim 1, wherein said probability distribution is retrieved based on varying price conditions, time of day, day of week, week of year, holidays, promotion activities, or competitive activities.

66. The item monitoring system as recited in claim 11, wherein said processing circuit is further configured to retrieve said probability distribution based on varying price conditions, time of day, day of week, week of year, holidays, promotion activities, or competitive activities.

67. The item monitoring system as recited in claim 11, wherein said probability distribution comprises a modified Poisson distribution consisting of weighted sums of Poisson distributions.

68. The item monitoring system as recited in claim 34, wherein said computer monitoring system provides forecasting of inventory or replenishment levels that removes effects of out of stock events before generating forecasting reports.

69. The item monitoring system as recited in claim 11, wherein all said times are redefined in terms of measured cumulative activity in one of a retail store or a category of items in a retail store.

70. The item monitoring system as recited in claim 11, wherein said probability distribution over inter-arrival times is a Poisson distribution with a parameter lambda that is a function of Base Lambda and Adjustment Alpha, which include information as saved data and lookup tables on: SKU, store, and various effects, including price point, promotion, season, holiday, time-of-day, day-of-week, and market conditions.

71. The item monitoring system as recited in claim 70, wherein a median is used to estimate said parameter lambda, thereby reducing bias in an estimate of a true parameter lambda arising from a contaminating effect of historical out-of-stock events.

72. The item monitoring system as recited in claim 39, wherein said mean and variance parameters to the renewal-reward process are not constants, but vary during the waiting time as conditions at said predetermined environment change.

73. The item monitoring system as recited in claim 11, said processing circuit also being configured to detect a slow event using a probability of observing more than K arrivals of said at least one item in the time actually observed for K arrivals of said at least one item.

74. The item monitoring system as recited in claim 11, said processing circuit also being configured to detect a fast event using a probability of observing less than J arrivals of said at least one item in the time actually observed for J arrivals of said at least one item.

75. The item monitoring system as recited in claim 63, further comprising:
(j) repeating steps (d)-(g) for one to six, additional, consecutive arrivals of said at least one item;
and wherein the step of determining, by way of said processing circuit, based on said retrieved probability distribution, that said observed inter-arrival time is anomalous is based on said one to six, additional, consecutive arrivals of said at least one item.

76. The item monitoring system as recited in claim 63, further comprising:
(j) repeating steps (d)-(g) for three, additional, consecutive arrivals of said at least one item;
and wherein the step of determining, by way of said processing circuit, based on said retrieved probability distribution, that said observed inter-arrival time is anomalous is based on said three, additional, consecutive arrivals of said at least one item.

77. The method as recited in claim 60, further comprising updating said probability distribution over inter-arrival times for said at least one item after it passes one of said plurality of sensing circuits.

78. The method as recited in claim 60, further comprising storing said probability distribution in said memory circuit, wherein the step of storing said probability distribution in said memory circuit comprises: creating or modifying an entry in a database that is stored in said memory circuit such that said entry can later be accessed in substantially real time with respect to the occurrence of the step of determining, by way of said processing circuit, whether said observed inter-arrival time is anomalous.

79. The method as recited in claim 60, wherein said identification characteristic information comprises: an SKU identifier of said at least one item, or a bar code from a label affixed to said at least one item.

80. The method as recited in claim 60, wherein the step of determining, by way of said processing circuit, whether said observed inter-arrival time is anomalous occurs in substantially real time with respect to the occurrence of said step of determining an observed inter-arrival time for said at least one item.

81. The method as recited in claim 60, wherein the step of receiving identification characteristic information pertaining to said at least one item as it passes one of said plurality of sensing circuits occurs in substantially real time with respect to said at least one item is being sold at a point-of-sale register within said predetermined environment.

82. The method as recited in claim 60, wherein said step of determining, by way of said processing circuit, whether said observed inter-arrival time is anomalous comprises: comparing said observed inter-arrival time of said at least one item to said probability distribution over inter-arrival times for said at least one item, while taking into consideration at least one of the following factors: varying price conditions, time of day, day of week, week of year, holidays, promotion activities, or competitive activities.

83. The method as recited in claim 60, wherein said step of determining whether or not said observed inter-arrival time is anomalous comprises: comparing said observed inter-arrival time of said at least one item to said probability distribution over inter-arrival times for said at least one item, while taking into consideration a usage history of items being disbursed and received.

84. The method as recited in claim 60, wherein, if no probability distribution over inter-arrivals times can be retrieved based on said identification characteristic information, then said at least one item is a new item, and a new item event is generated, and a probability distribution over inter-arrival times is created for said new item.

85. The method as recited in claim 60, wherein said probability distribution comprises a modified Poisson distribution consisting of weighted sums of Poisson distributions.

86. The method as recited in claim 60, wherein said probability distribution is determined by training said computer monitoring system by use of one of: (i) historical transaction data, or (ii) transaction data that is gathered in substantially real time.

87. The method as recited in claim 86, wherein said training of the computer monitoring system occurs in a plurality of iterative passes to create: a Final Base Lambda Table, a Final Adjustment Alpha Table, a Store Table, and a UPC Table or Item Table.

88. The method as recited in claim 60, wherein all said times are redefined in terms of measured cumulative activity in said predetermined environment, and wherein said measured cumulative activity is one of (i) quantity of packaged items sold or processed, (ii) sales in monetary units, or (iii) number of different items in each transaction at a point of sale.

89. The method as recited in claim 60, wherein all said times are redefined in terms of measured cumulative activity in one of a retail store or a category of items in a retail store.

90. The method as recited in claim 60, wherein said probability distribution over inter-arrival times is a Poisson distribution with a lambda parameter that is a function of Base Lambda and Adjustment Alpha, which include information as saved data and lookup tables on: SKU, store, and various effects, including price point, promotion, season, holiday, time-of-day, day-of-week, and market conditions.

91. The method as recited in claim 90, wherein a median is used to estimate said parameter lambda, thereby reducing bias in an estimate of a true parameter lambda arising from a contaminating effect of historical out-of-stock events.

92. The method as recited in claim 60, each observed inter-arrival time for said at least one item and a quantity of said at least one item are linked together as a renewal-reward process, in which the quantity of said at least one item is a separate random log-normal variable with a mean beta and a beta variance.

93. The method as recited in claim 92, wherein said mean and variance parameters to the renewal-reward process are not constants, but vary during the observed inter-arrival time as conditions at said predetermined environment change.

94. The method as recited in claim 60, further comprising: detecting a slow event using a probability of observing more than K arrivals of said at least one item in the time actually observed for K arrivals of said at least one item.

95. The method as recited in claim 60, further comprising: detecting a fast event using a probability of observing less than J arrivals of said at least one item in the time actually observed for J arrivals of said at least one item.

96. The method as recited in claim 60, wherein each observed inter-arrival time for said at least one time varies as a function of: total predetermined environment traffic, item category traffic, time of day, day of week, season, holidays, and market conditions of said predetermined environment.

97. The method as recited in claim 60, wherein said predetermined environment comprises one of: a retail store, a chain of retails stores, a warehouse, a chain of warehouses, a distribution point, a chain of distribution points, manufacture's distribution center or a chain of manufacture's distribution centers.

98. The method as recited in claim 60, further comprising: automatically re-training said computer monitoring system on a periodic basis using substantially real time data throughout a periodic interval.

99. The method as recited in claim 98, wherein said re-training of the computer monitoring system occurs in a plurality of iterative passes to create: a Final Base Lambda Table, a Final Adjustment Alpha Table, a Store Table, and a UPC Table.

100. The method as recited in claim 99, wherein said iterative passes comprise: (i) computing Initial Base Lambdas using total store sales and total category sales; (ii) computing Intermediate Base Lambdas using item transaction data and said item's inter-arrival time using said Initial Base Lambdas; (iii) computing Initial Adjustment Alphas using an adjusted item inter-arrival time and a plurality of current effects; (iv) computing Final Base Lambdas using said Initial Adjustment Alphas and using said item transaction data and said item's inter-arrival time; and (v) computing Final Adjustment Alphas using said Final Base Lambdas and a plurality of current effects, and computing a Beta Table.

101. The method as recited in claim 100, wherein said Final Base Lambda Table, Final Adjustment Alpha Table, Store Table, and UPC Table are used to calculate a probability distribution of inter-arrival times for said at least one item, and wherein said inter-arrival time is stated either in units of: (i) time, or (ii) quantity of sales in monetary units.

102. The method as recited in claim 60, wherein when said observed inter-arrival time is stated in units of quantity, said quantity is stated in terms of either the number of unique items sold or the total number of items sold.

103. The method as recited in claim 60, wherein information upon which said probability distribution is retrieved is further comprised of interval information, wherein said interval information is comprised of information about one or more conditions occurring during said observed inter-arrival time.

104. The method as recited in claim 103, wherein said information about one or more conditions occurring during said observed inter-arrival time is comprised of information about varying price conditions, time of day, day of week, week of year, holidays, promotion activities, or competitive activities.

105. The method as recited in claim 60, further comprising:

providing a point-of-sale controller that is in communication with said plurality of sensing circuits and with said communications port.

106. The method as recited in claim 60, wherein said probability distribution is retrieved based on varying price conditions, time of day, day of week, week of year, holidays, promotion activities, or competitive activities.

107. The item monitoring system as recited in claim 63, said processing circuit also being configured to update said probability distribution over inter-arrival times for said at least one item after it passes one of said plurality of sensing circuits.

108. The item monitoring system as recited in claim 63, said processing circuit also being configured to store said probability distribution in said memory circuit, wherein said memory circuit creates or modifies an entry in a database that is stored in said memory circuit such that said entry can later be accessed in substantially real time with respect to when said processing circuit determines whether said observed inter-arrival time is anomalous.

109. The item monitoring system as recited in claim 63, wherein said identification characteristic information comprises: an SKU identifier of said at least one item, or a bar code from a label affixed to said at least one item.

110. The item monitoring system as recited in claim 63, wherein said processing circuit determines whether said observed inter-arrival time is anomalous in substantially real time with respect to when said processing circuit determines an observed inter-arrival time for said at least one item.

111. The item monitoring system as recited in claim 63, wherein said processing circuit receives identification characteristic information pertaining to said at least one item as it passes one of said plurality of sensing circuits occurs when said at least one item is being sold at a point-of-sale register within said predetermined environment.

112. The item monitoring system as recited in claim 63, said processing circuit generating an inter-arrival time event announcement when said observed inter-arrival time is anomalous is indicative of one of the following conditions: (i) said at least one item is substantially hidden while residing in its correct location on a display shelf; (ii) said at least one item is completely out-of-stock on said display shelf; (iii) said at least one item has been placed at an incorrect location within said predetermined environment, or (iv) access to said at least one item has been substantially prevented by an obstruction.

113. The item monitoring system as recited in claim 63, wherein said processing circuit is further configured to determine whether said observed inter-arrival time is anomalous by comparing said observed inter-arrival time of said at least one item to said probability distribution over inter-arrival times for said at least one item, while taking into consideration at least one of the following factors: varying price conditions, time of day, day of week, week of year, holidays, promotion activities, or competitive activities.

114. The item monitoring system as recited in claim 63, wherein said processing circuit is further configured to determine whether or not said observed inter-arrival time is anomalous by comparing said observed inter-arrival time of said at least one item to said probability distribution over inter-arrival times for said at least one item, while taking into consideration a usage history of items being disbursed and received.

115. The item monitoring system as recited in claim 63, if no probability distribution over inter-arrivals times can be retrieved based on said identification characteristic information, then said at least one item is a new item, and a new item event is generated and a probability distribution over inter-arrival times is created for said new item.

116. The item monitoring system as recited in claim 63, further comprising: a point-of-sale controller that is in communication with said plurality of sensing circuits and with said communications port.

117. The item monitoring system as recited in claim 63, wherein said probability distribution comprises a modified Poisson distribution consisting of weighted sums of Poisson distributions.

118. The item monitoring system as recited in claim 63, wherein said probability distribution is determined by training said computer monitoring system by use of one of: (i) historical transaction data, or (ii) transaction data that is gathered in substantially real time.

119. The item monitoring system as recited in claim 118, wherein said training of the computer monitoring system occurs in a plurality of iterative passes to create: a Final Base Lambda Table, a Final Adjustment Alpha Table, a Store Table, and a UPC Table.

120. The item monitoring system as recited in claim 63, wherein all said times are redefined in terms of measured cumulative activity in said predetermined environment, and wherein said measured activity is one of (i) quantity of packaged items sold or processed, (ii) sales in monetary units, or (iii) number of different items in each transaction at a point of sale.

121. The item monitoring system as recited in claim 63, wherein all said times are redefined in terms of measured cumulative activity in one of a retail store or a category of items in a retail store.

122. The item monitoring system as recited in claim 63, wherein said probability distribution over inter-arrival times is a Poisson distribution with a parameter lambda that is a function of Base Lambda and Adjustment Alpha, which include information as saved data and lookup tables on: SKU, store, and various effects, including price point, promotion, season, holiday, time-of-day, day-of-week, and market conditions.

123. The item monitoring system as recited in claim 122, wherein a median is used to estimate said parameter lambda, thereby reducing bias in an estimate of a true parameter lambda arising from a contaminating effect of historical out-of-stock events.

124. The item monitoring system as recited in claim 123, wherein said mean and variance parameters to the renewal-reward process are not constants, but vary during the observed inter-arrival time as conditions at said predetermined environment change.

125. The item monitoring system as recited in claim 63, wherein each observed inter-arrival time for said at least one item and a quantity of said at least one item are linked together as a renewal-reward process, in which the quantity of said at least one item is a separate random log-normal variable with a mean beta and a beta variance.

126. The item monitoring system as recited in claim 63, said processing circuit also being configured to detect a slow event using a probability of observing more than K arrivals of said at least one item in the time actually observed for K arrivals of said at least one item.

127. The item monitoring system as recited in claim 63, said processing circuit also being configured to detect a fast event using a probability of observing less than J arrivals of said at least one item in the time actually observed for J arrivals of said at least one item.

128. The item monitoring system as recited in claim 63, wherein each observed inter-arrival time for said at least one item varies as a function of: total predetermined environment traffic, item category traffic, time of day, day of week, season, holidays, and market conditions of said predetermined environment.

129. The item monitoring system as recited in claim 63, wherein said predetermined environment comprises one of: a retail store, a chain of retails stores, a warehouse, a chain of warehouses, a distribution point, or a chain of distribution points.

130. The item monitoring system as recited in claim 63, wherein said processing circuit is further configured to automatically re-train said computer monitoring system on a periodic basis using substantially real time data throughout a periodic interval.

131. The item monitoring system as recited in claim 130, wherein said re-training of the computer monitoring system occurs in a plurality of iterative passes to create: a Final Base Lambda Table, a Final Adjustment Alpha Table, a Store Table, and a UPC Table.

132. The item monitoring system as recited in claim 131, wherein said iterative passes comprise: (i) computing Initial Base Lambdas using total store sales and total category sales; (ii) computing Intermediate Base Lambdas using item transaction data and said item's inter-arrival time using said Initial Base Lambdas; (iii) computing Initial Adjustment Alphas using an adjusted item inter-arrival time and a plurality of current effects; (iv) computing Final Base Lambdas using said Initial Adjustment Alphas and using said item transaction data and said item's inter-arrival time; and (v) computing Final Adjustment Alphas using said Final Base Lambdas and a plurality of current effects, and computing a Beta Table.

133. The item monitoring system as recited in claim 132, wherein said Final Base Lambda Table, Final Adjustment Alpha Table, Store Table, and UPC Table are used to calculate a probability distribution over inter-arrival times for said at least one item, and wherein said inter-arrival time is stated either in units of: quantity or sales in monetary units.

134. The item monitoring system as recited in claim 63, wherein when said observed inter-arrival time is stated in units of quantity, said quantity is stated in terms of either the number of unique items sold or the total number of items sold.

135. The item monitoring system as recited in claim 63, wherein information upon which said probability distribution is retrieved is comprised of on interval information, wherein said interval information is comprised of information about one or more conditions occurring during said observed inter-arrival time.

136. The item monitoring system as recited in claim 135, wherein said information about one or more conditions occurring during said observed inter-arrival time is comprised of information about varying price conditions, time of day, day of week, week of year, holidays, promotion activities, or competitive activities.

137. The item monitoring system as recited in claim 63, wherein said processing circuit is further configured to retrieve said probability distribution based on varying price conditions, time of day, day of week, week of year, holidays, promotion activities, or competitive activities.

* * * * *